US009963016B2

(12) United States Patent
Uehara et al.

(10) Patent No.: US 9,963,016 B2
(45) Date of Patent: May 8, 2018

(54) WIND DIRECTION ADJUSTER

(71) Applicant: NIHON PLAST CO., LTD., Shizuoka (JP)

(72) Inventors: Nobumasa Uehara, Shizuoka (JP); Yuto Suzuki, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 258 days.

(21) Appl. No.: 14/717,120

(22) Filed: May 20, 2015

(65) Prior Publication Data

US 2015/0336445 A1 Nov. 26, 2015

(30) Foreign Application Priority Data

May 21, 2014 (JP) ................................ 2014-105636
Dec. 22, 2014 (JP) ................................ 2014-258481

(51) Int. Cl.
*B60H 1/34* (2006.01)

(52) U.S. Cl.
CPC ......... *B60H 1/3421* (2013.01); *B60H 1/3442* (2013.01); *B60H 2001/3478* (2013.01)

(58) Field of Classification Search
CPC ................ B60H 1/3421; B60H 1/3442; B60H 2001/3478
USPC ................................ 454/154, 155, 143, 152
See application file for complete search history.

(56) References Cited

U.S. PATENT DOCUMENTS

| | | | | |
|---|---|---|---|---|
| 3,319,560 A * | 5/1967 | Schaaf | B60H 1/3442 | 239/582.1 |
| 7,527,553 B2 * | 5/2009 | Steinbeiss | B60H 1/3442 | 454/155 |
| 7,819,728 B2 * | 10/2010 | Beckley | B60H 1/3407 | 220/822 |
| 2011/0111685 A1 * | 5/2011 | Benamira | B60H 1/3442 | 454/155 |
| 2015/0202946 A1 * | 7/2015 | Inagaki | B60H 1/3428 | 454/154 |

FOREIGN PATENT DOCUMENTS

| | | | |
|---|---|---|---|
| DE | 10223660 A1 * | 12/2003 | B60H 1/34 |
| JP | 63-196038 U | 12/1988 | |
| JP | 2002-137628 A | 5/2002 | |
| JP | 2002-168511 A | 6/2002 | |

* cited by examiner

*Primary Examiner* — Gregory Huson
*Assistant Examiner* — Dana Tighe
(74) *Attorney, Agent, or Firm* — Brundidge & Stanger, P.C.

(57) ABSTRACT

A wind direction adjuster is disclosed in which an inner-side turning axis provided to a louver main body in a protruding manner is axially supported by an inner-side axial support hole provided in a spacer fixed to a bearing portion provided to a housing portion. Moreover, an actuator axis provided to the louver main body in a protruding manner at a position spaced from the inner-side turning axis is inserted into an operation opening provided to the spacer. In addition, a louver moves forward or rearward by pushing the actuator axis by a projecting portion in association with turning of a knob turnable with respect to the bearing portion and the spacer. The louvers can be moved in conjunction with each other with a simple configuration.

7 Claims, 17 Drawing Sheets

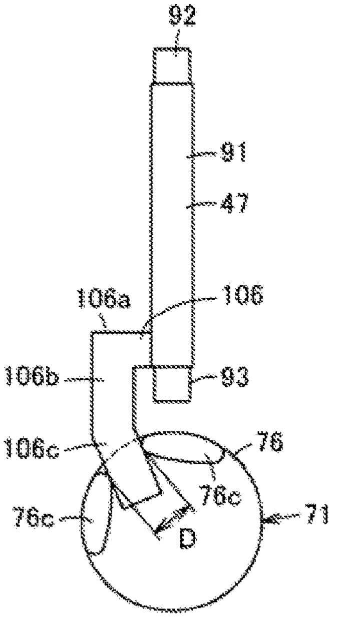
FIG. 13A1
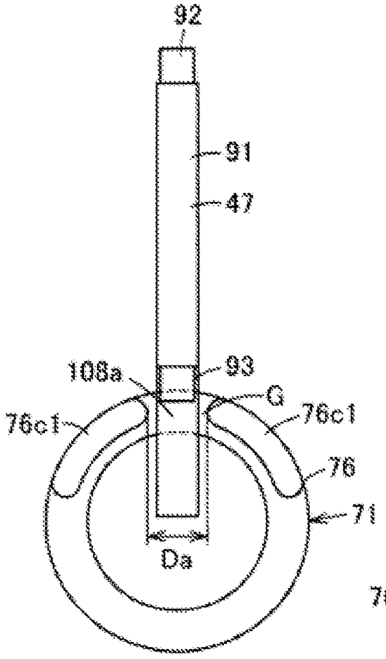
FIG. 13A2
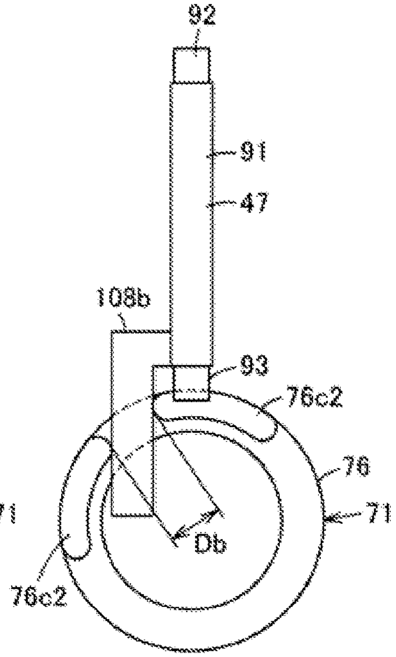
FIG. 13A3
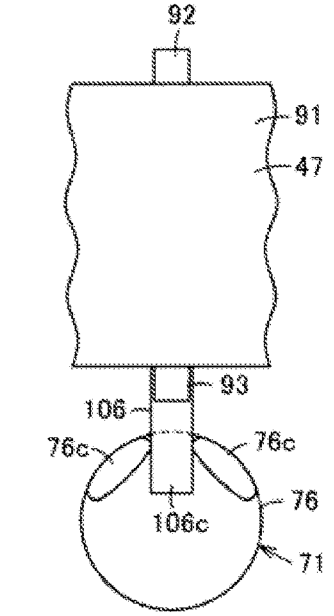
FIG. 13B1
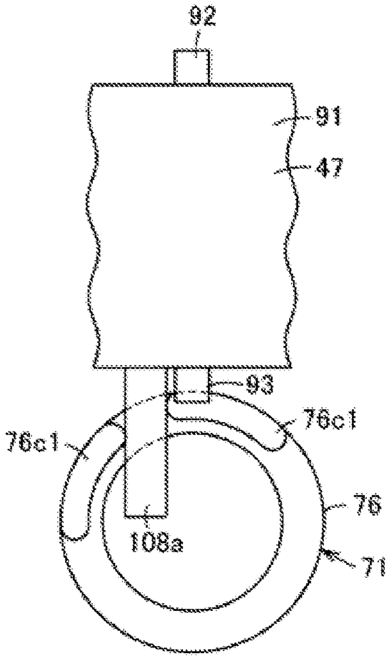
FIG. 13B2
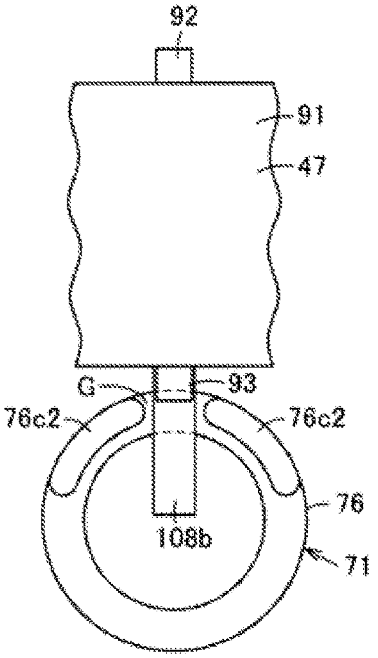
FIG. 13B3

WIND DIRECTION ADJUSTER

CROSS REFERENCE TO RELATED APPLICATION

This application is entitled to the benefit of Japanese Patent Applications No. 2014-105636 filed on May 21, 2014, and No. 2014-258481 filed on Dec. 22, 2014, the disclosures of which including the specifications, drawings and abstracts are incorporated herein by reference in their entireties.

TECHNICAL FIELD

The present invention relates to a wind direction adjuster including a movable louver inside a tubular housing portion.

BACKGROUND ART

Known wind direction adjusters include one that is disposed at a wind outlet for blowing air in an air conditioner used in a vehicle such as an automobile. Such a wind direction adjuster is also called an air conditioning blower, an air outlet, a ventilator or a register, for example, and is installed at each part of a vehicle such as an instrument panel or a center console and makes a contribution to improving the cooling and heating comfort performance.

There is a known configuration for such a wind direction adjuster in which the adjuster is formed in a round shape, for example, and changes the concentration and spreading states of wind by causing multiple louvers to turn in conjunction with one another. Examples of such a configuration include one in which a bevel gear is coupled to an operation knob turnably provided along the center axis of a cylindrical grill, and multiple louvers including bevel gears to mesh with the bevel gear are arranged to set their turning axes to the radiation direction (radial direction), so that the louvers are turned in conjunction with one another via turning of the operation knob (see, e.g., Patent Literature (hereinafter, referred to as "PTL") 1).

In addition, the following configuration is also known in which a square tube operation unit is supported movably in the forward and rearward direction along the center axis of a cylindrical housing, for example, and pinions provided to the turning axes of four louvers are set in mesh with racks provided to four surfaces of the operation unit so that these louvers are turned simultaneously with forward and rearward movement of the operation unit. In this configuration, the ventilation resistance is also reduced by preventing turbulence flow by covering the meshed portion of the racks and pinions with a cover (see, e.g., PTL 2).

However, the configurations mentioned above both involve coupling of the gears and thus require a high part accuracy, and their assembly operation performance is not necessarily favorable. For this reason, another configuration to avoid cost increases is required.

Moreover, in order to smoothly operate gears coupled with one another, the gears need to be larger in size, which causes an increase in the ventilation resistance and/or a reduction in the degree of freedom for design.

Regarding this point, the following configuration is known in which a bearing portion is provided at the center axis portion of a cylindrical housing, and multiple louvers are disposed radially while being axially supported turnably between an outer frame portion of the housing and the bearing portion. In addition, guide bearing portions provided to the respective louvers in a protruding manner are engaged with guide portions which are cam grooves of a link unit formed as a separate unit and disposed on a downstream side of the housing movably in the forward and rearward direction along the axis direction. In this configuration, the louvers are thus turned simultaneously by forward and rearward movement of the link unit (see, e.g., PTL 3).

Although this configuration requires no meshing of gears, the link unit as large as the housing moves forward and rearward. For this reason, the configuration involves a large actuation space and a limitation on the adoptable layout. Moreover, another configuration is required that prevents a limitation on the oscillation angle otherwise caused by the link unit in contact with a downstream side duct when the housing oscillates.

CITATION LIST

Patent Literature

PTL 1
Japanese Utility Model (Registration) Application Laid-open No. 63-196038 (pages 3 and 4 and FIGS. 1 to 4)
PTL 2
Japanese Patent Application Laid-Open No. 2002-168511 (pages 3 and 4 and FIGS. 2 and 3)
PTL 3
Japanese Patent Application Laid-Open No. 2002-137628 (pages 3 and 4 and FIGS. 1 and 2)

SUMMARY OF INVENTION

Technical Problem

As described above, there is a demand for a wind direction adjuster small in size, capable of suppressing manufacturing costs, and having a high degree of freedom for design and layout.

The present invention has been made in consideration of the points mentioned above and aims to provide a wind direction adjuster small in size, capable of suppressing manufacturing costs, and having an improved degree of freedom for design and layout.

Solution to Problem

A wind direction adjuster according to a first aspect includes: a housing portion including a cylindrical outer frame portion and a bearing portion, the cylindrical outer frame portion having an inner side serving as a flow passage, the bearing portion being provided at a center axis side position of the cylindrical outer frame portion; a fixing unit including an inner-side axial support portion and an operation opening that is formed along a circumferential direction, the fixing unit being fixed to the bearing portion; an operation unit including a projecting portion, the operation unit being axially supported by the bearing portion turnably in the circumferential direction and being externally operable; and a louver including a louver main body, an inner-side turning axis, and an actuator axis, the inner-side turning axis being provided to the louver main body in a protruding manner and being axially supported by the inner-side axial support portion, the actuator axis being provided to the louver main body in a protruding manner at a position spaced from the inner-side turning axis, being inserted into the operation opening and being movable along the operation opening when pushed by the projecting portion associated with turning of the operation unit, the louver main body being disposed along a radial direction of the housing portion.

The wind direction adjuster according to a second aspect is the wind direction adjuster according to the first aspect, in which: the housing portion further includes an outer-side axial support portion provided to the cylindrical outer frame portion, and the louver further includes an outer-side turning axis provided to the louver main body in a protruding manner and configured to be axially supported by the outer-side axial support portion.

The wind direction adjuster according to a third aspect is the wind direction adjuster according to any one of the first and the second aspects, in which the inner-side turning axis is provided in a protruding manner at a more leeward position than the actuator axis in the louver main body.

The wind direction adjuster according to a fourth aspect is the wind direction adjuster according to any one of the first and the second aspects, in which the inner-side turning axis is provided in a protruding manner at a more windward position than the actuator axis in the louver main body.

The wind direction adjuster according to a fifth aspect is the wind direction adjuster according to the fourth aspect, in which: the actuator axis includes: a protruding portion that protrudes from the louver main body in a thickness direction of the louver main body; a coupling portion that is bent towards the operation unit from the protruding portion; and an insertion axis portion that is provided at a leading end portion of the coupling portion in a bent shape towards the operation unit so as to fold back in the thickness direction and that is inserted between the projecting portions of the operation unit and held by the projecting portions.

The wind direction adjuster according to a sixth aspect is the wind direction adjuster according to any one of the first through the fifth aspects which further includes: a cylindrical outer portion configured to house the housing portion; and a link unit that is axially supported turnably in a predetermined reciprocating direction with respect to the cylindrical outer portion and is configured to axially support the fixing unit turnably in another reciprocating direction intersecting with the predetermined reciprocating direction.

The wind direction adjuster according to a seventh aspect is the wind direction adjuster according to any one of the first through the sixth aspects, in which the louver includes a ventilation opening made by forming an opening that penetrates through the louver main body in a thickness direction of the louver main body.

The wind direction adjuster according to an eighth aspect is the wind direction adjuster according to the seventh aspect, in which: the inner-side turning axis is axially supported by the inner-side axial support portion at a more leeward position than the outer-side turning axis, and the inner-side turning axis and the outer-side turning axis are inclined towards a windward side with respect to the radial direction of the housing portion.

Advantageous Effects of Invention

With the wind direction adjuster according to the first aspect, the inner-side turning axis provided to the louver main body in a protruding manner is axially supported by the inner-side axial support portion provided to the fixing unit fixed to the bearing portion provided at a center axis side position of the cylindrical outer frame portion having an inner side serving as a flow passage in the housing portion. The louver moves forward and rearward when the actuator axis provided to the louver main body in a protruding manner at a position spaced from the inner-side turning axis is inserted into the operation opening provided in the fixing unit and is pushed by the projecting portion by turning of the projecting portion associated with turning by an external operation of the operation unit turnable with respect to the bearing portion and the fixing unit. Thus, it is made possible to move louvers in conjunction with each other with a simple configuration and without using a precision component such as a gear for coupling the operation unit and the louvers together, for example, and thus to downsize the coupling structure of the operation unit, fixing unit, and louvers. Thus, components can be formed without much work and incorporation of the components is easy. For this reason, it is possible to suppress manufacturing costs while reducing the ventilation resistance and improving the degree of freedom in design and layout as a wind direction adjuster.

With the wind direction adjuster according to the second aspect, in addition to the effects of the wind direction adjuster according to the first aspect, axially supporting the outer-side turning axis provided to the louver main body in a protruding manner, using the outer-side axial support portion provided to the outer frame portion of the housing portion makes it possible to more surely support the louvers with respect to the outer frame portion and also to turn the louvers more smoothly.

With the wind direction adjuster according to the third aspect, in addition to the effects of the wind direction adjuster according to one of the first and the second aspects, providing the inner-side turning axis of the louver at a more leeward position than the actuator axis makes it unlikely for the louvers and louver main body to be seen by a passenger, thus improving the appearance of the wind direction adjuster.

With the wind direction adjuster according to the fourth aspect, in addition to the effects of the wind direction adjuster according to one of the first and the second aspects, providing the inner-side turning axis of the louver at a more windward position than the actuator axis makes it possible to increase the turning range of each of the louver main bodies and also to entirely close the flow passage in the housing portion by the louver main bodies.

With the wind direction adjuster according to the fifth aspect, in addition to the effects of the wind direction adjuster according to the fourth aspect, forming the actuator axis using: the protruding portion provided in a protruding manner from the louver main body in the thickness direction; the coupling portion bent toward the operation unit from the protruding portion; and the insertion axis portion bent towards the operation unit to fold back to the thickness direction of the louver main body from the leading end portion of the coupling portion, suppresses a change in the insertion angle of the insertion axis portion between the projecting portions associated with turning of the louver, and allows a short distance to be set between the projecting portions. Thus, the size of the operation unit can be suppressed, and further downsizing is made possible.

With the wind direction adjuster according to the sixth aspect, in addition to the effects of the wind direction adjuster according to any one of the first to the fifth aspects, axially supporting the link unit turnably in a predetermined reciprocating direction with respect to the cylindrical outer portion configured to house the housing portion and axially supporting the fixing unit with respect to the link unit turnably in another reciprocating direction intersecting with the predetermined reciprocating direction allows for oscillation of the fixing unit and the housing portion in which this fixing unit is fixed to the bearing portion, in any direction, and allows for setting a large oscillation angle for the housing portion.

With the wind direction adjuster according to the seventh aspect, in addition to the effects of the wind direction adjuster according to any one of the first to the sixth aspects, forming the ventilation opening that penetrates through the louver main body of each louver in the thickness direction allows for concentration of the wind towards the center of the wind outlet by the ventilation openings while the louvers are turned to proceed and allows for an increase in the flow rate of wind with a simple configuration.

With the wind direction adjuster according to the eighth aspect, in addition to the effects of the wind direction adjuster according to the seventh aspect, axially supporting the inner-side turning axis by the inner-side axial support portion at a more leeward position than the outer-side turning axis and causing the inner-side turning axis and the outer-side turning axis to incline in a windward direction with respect to the radial direction of the housing portion allows for concentration of wind towards the center axis of the housing portion along the louver main bodies when the louvers are turned to proceed. Thus, the wind can be more effectively concentrated towards the center of the wind outlet while the ventilation resistance is suppressed.

BRIEF DESCRIPTION OF DRAWINGS

FIG. 13A1 is an explanatory drawing schematically illustrating a positional relationship between a louver and an operation unit of the wind direction adjuster in the concentration mode;

FIG. 13A2 is an explanatory drawing schematically illustrating a positional relationship between a louver and an operation unit of a wind direction adjuster according to related art in a concentration mode;

FIG. 13A3 is an explanatory drawing schematically illustrating a positional relationship between a louver and an operation unit of a wind direction adjuster according to different related art in a concentration mode;

FIG. 13B1 is an explanatory drawing schematically illustrating a positional relationship between a louver and an operation unit of the wind direction adjuster in a spreading mode or blocking mode;

FIG. 13B2 is an explanatory drawing schematically illustrating a positional relationship between a louver and an operation unit of a wind direction adjuster according to related art in a spreading mode or blocking mode;

FIG. 13B3 is an explanatory drawing schematically illustrating a positional relationship between a louver and an operation unit of a wind direction adjuster according to different related art in a spreading mode or blocking mode;

DESCRIPTION OF EMBODIMENTS (First Embodiment)

Hereinafter, a description will be given of a wind direction adjuster according to a first embodiment of the present invention with reference to the accompanying drawings.

Figure 7:
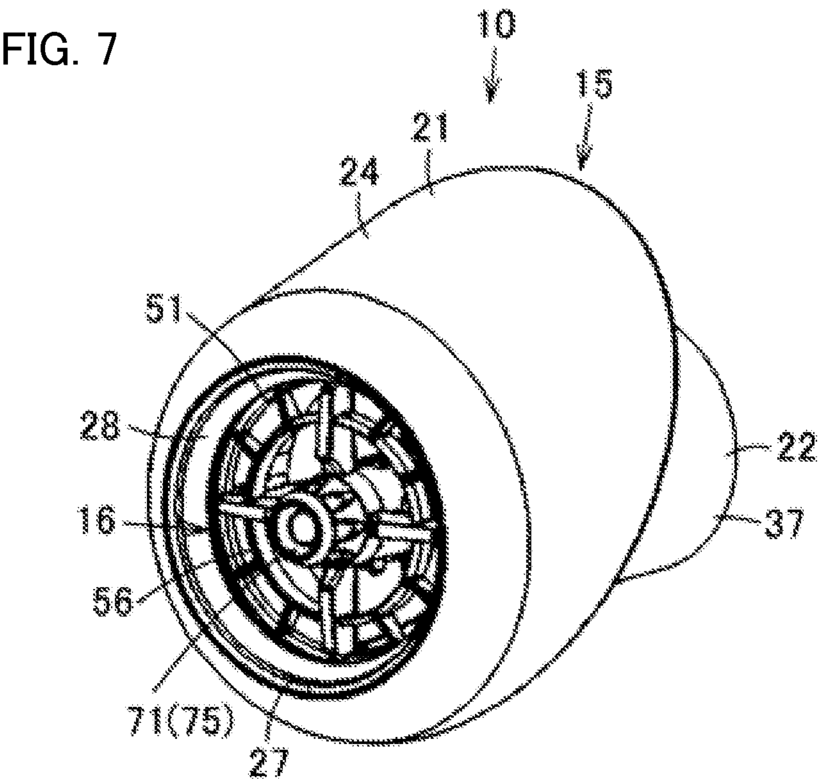
FIG. 7 is a perspective view of the wind direction adjuster.
Figure 8:
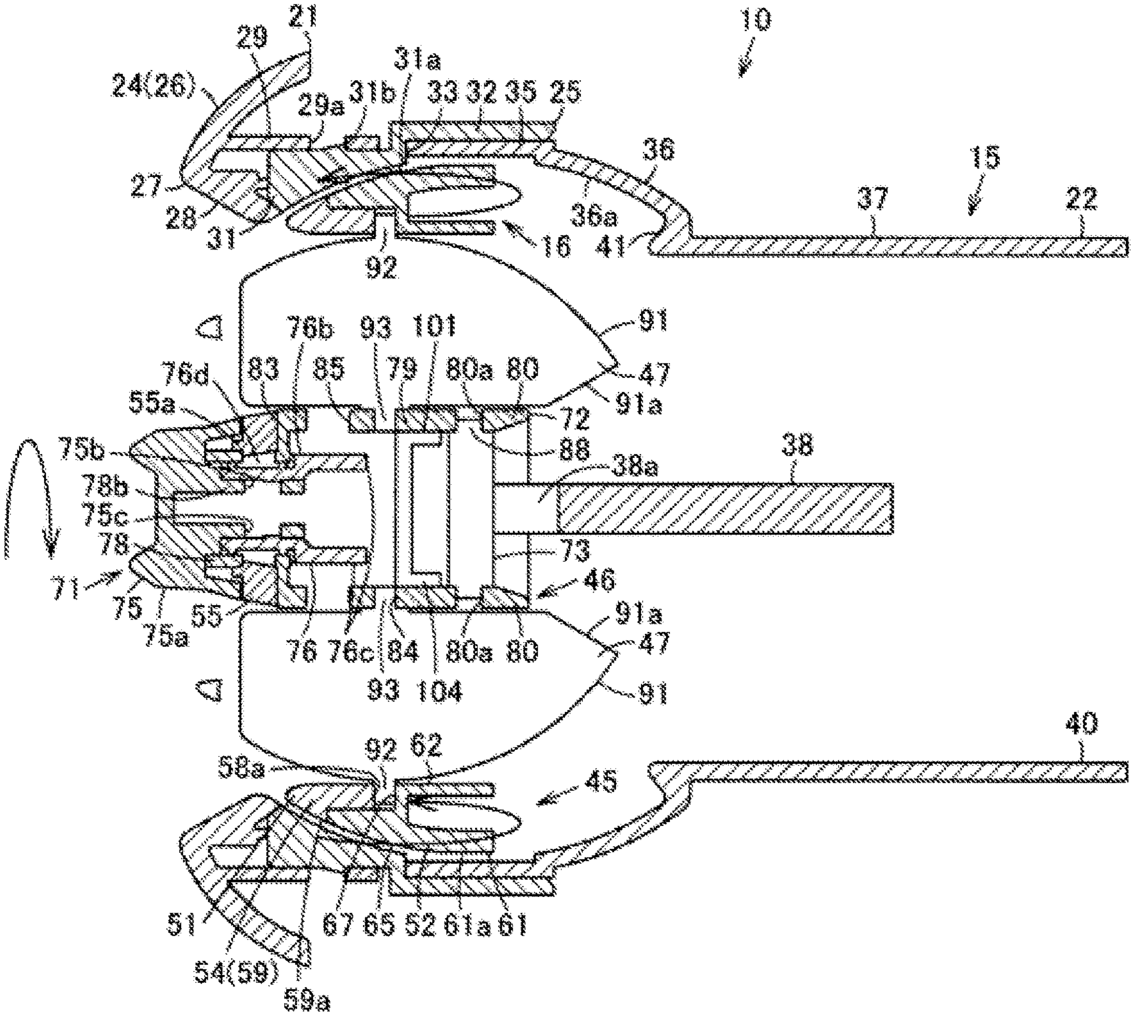
FIG. 8 is a vertical cross-sectional view of a wind direction adjuster according to a second embodiment of the present invention.

In FIG. 7, reference numeral 10 denotes a wind direction adjuster. Wind direction adjuster 10 is also called a louver unit or a ventilator, for example. Wind direction adjuster 10 is attached to an instrument panel serving as a component of an automobile for attaching components and is connected to an air conditioner. More specifically, wind direction adjuster 10 is a part of a vehicle air conditioner that blows air into the vehicle interior and performs air conditioning. Hereinafter, a downstream side of blowing wind (leeward side), i.e., the passenger side is referred to as "front side" and an upstream side of wind (windward side) is referred to as "rear side." In addition, as to the left and right direction and up and down direction, a description will be given, assuming a state where the wind direction adjuster is attached to the automobile mentioned above as an example.

As illustrated in FIGS. 1 through 7, wind direction adjuster 10 includes outer portion 15, and louver assembly 16, which is turnably assembled in outer portion 15.

Outer portion 15 includes front-side outer portion 21, which serves as a first outer portion located at a front portion, and rear-side outer portion 22, which serves as a second outer portion located at a rear position. Outer portion 15 holds louver assembly 16 using front-side and rear-side outer portions 21 and 22 in the front and rear direction.

Front-side outer portion 21 is also called a panel and integrally includes cylindrical outer wall portion 24 and front-side outer-portion main body 25. Front-side outer-portion main body 25 is a cylindrical first outer-portion main body that is positioned in a concentric shape with an inner side of outer wall portion 24 and where the front end of rear-side outer portion 22 is locked. The front end of front-side outer portion 21 is located at the most leeward position of wind direction adjuster 10.

Outer wall portion 24 is exposed from the instrument panel, for example, and serves as a design surface of wind direction adjuster 10. Outer wall portion 24 is formed so as to gradually protrude rearward from the lower side to the upper side while gradually increasing in diameter in a direction from the front end to the rear end of outer wall portion 24. In addition, finisher 26, which is a cylindrical decorative member, is attached to the front end of outer wall portion 24.

Wind outlet 27 is formed at an inner edge portion of finisher 26, and guide surface 28, which is a cylindrical surface extending to the inner edge of wind outlet 27 and having the inner circumference gradually increasing in diameter from the rear side to the front side, is further formed. Finisher 26 includes cylindrical fixing portion 29, which is formed coaxially at an outer side position than guide surface 28 in a protruding manner for fixing front-side outer-portion main body 25. Fixing portion 29 includes an opening formed as locking hole 29*a* for locking a front end portion of front-side outer-portion main body 25.

Front-side outer-portion main body 25 includes front-side portion 31, which is a first main body portion, and rear-side portion 32, which is a second main body portion extending to the rear end of front-side portion 31.

The inner circumference portion of front-side portion 31 extends to the rear end of guide surface 28 and gradually decreases in diameter from the rear side to the front side. Accordingly, the inner circumference portion of front-side portion 31 is referred to as sliding contact surface 31*a* forming a part of a spherical surface with which the outer circumference side of louver assembly 16 is brought into sliding contact. In addition, claw portion 31*b*, which is inserted and locked in locking hole 29*a*, is formed at the outer circumference portion of front-side portion 31 in protruding manner. Meanwhile, rear-side portion 32 has a cylindrical shape having a diameter larger than front-side portion 31. Accordingly, the portion where rear-side portion 32 starts extending from front-side portion 31 serves as stepped stopper portion 33, which positions the front end of rear-side outer portion 22. Furthermore, turn-stopper portions 32*a* (only one of them is illustrated), which stop turning of front-side outer portion 21 and rear-side outer portion 22, are provided at left and right side positions of the inner circumference side of rear-side portion 32 by forming notches, respectively. Furthermore, multiple locking holes 32*b* for locking rear-side outer portion 22 are formed along the radial direction in rear-side portion 32.

Rear-side outer portion 22 is also called a duct. Rear-side outer portion 22 includes: cylindrical fitting portion 35, which is fitted to the inner circumference of rear-side portion 32 of front-side outer portion main body 25 of front-side outer portion 21; curved portion 36, which extends to the rear end of fitting portion 35; and cylindrical air passage 37, which extends to the rear end of curved portion 36. The inside of rear-side outer portion 22 serves as a flow passage for the wind to flow through.

Turn-stopper protruding portions 35*a*, which are inserted and fitted to turn-stopper portions 32*a*, respectively, are formed in a protruding manner on the left and right sides of fitting portion 35. Moreover, locking claw portions 35*b*, which are inserted and locked in locking holes 32*b*, respectively, are provided in a protruding manner to the outer circumference portion of fitting portion 35. The inner circumference of curved portion 36 serves as sliding contact surface 36*a*, which has the inner circumference gradually increasing in diameter from the rearward to the forward and forms a part of the same spherical surface as sliding contact surface 31*a*. In addition, air passage 37 is formed in a linear cylindrical shape and includes assembly axial support portion 38, which is formed at a center axis portion of air passage 37. In addition, assembly axial support portion 38 is coupled to the inner circumference of air passage 37 by radially arranged multiple ribs 39. Moreover, the rear end of air passage 37 serves as introduction port 40 through which wind is introduced. Turn-regulating portion 41, which is brought into contact with louver assembly 16 to regulate the turn angle of louver assembly 16, is provided in a protruding manner at the portion where the front end of air passage 37 and the rear end of sliding contact surface 36*a* of curved portion 36 are in contact with each other.

Assembly axial support portion 38 includes left and right side surfaces 38*a*, which face each other in a parallel fashion and extend forward up to the center axis position of air passage 37. In addition, assembly axial support portion 38 includes openings serving as circular axial support holes 38*b*, which are formed near the front end of side surfaces 38*a* along the left and right direction for axially supporting louver assembly 16. Accordingly, louver assembly 16 is axially supported by axial support holes 38*b* turnably in the up and down direction that is a reciprocating direction with respect to outer portion 15.

Louver assembly 16 includes: housing portion 45, connection portion 46, which is attached to housing portion 45, and multiple louvers such as four louvers 47, which are positioned between housing portion 45 and connection portion 46. Louver assembly 16 is capable of seamlessly switching between a concentration mode (normal mode) for concentrating wind in a predetermined direction and a spreading mode for spreading wind.

Housing portion 45 includes: front-side housing portion 51, which serves as a cylindrical first housing portion, and rear-side housing portion 52, which serves as a second cylindrical housing portion, and which is a separate unit of front-side housing portion 51. The space inside housing portion 45 serves as a passage for wind to pass through.

Front-side housing portion 51 integrally includes: cylindrical (annular) front-side outer frame portion 54 serving as a first outer frame portion; cylindrical (annular) bearing portion 55, which is formed at the center axis portion of front-side outer frame portion 54; and connecting ribs 56 for connecting and reinforcing front-side outer frame portion 54 and bearing portion 55.

Front-side outer frame portion 54 includes: linear cylindrical insertion portion 58, which is inserted into the front end side of rear-side outer portion 22; and front-side sliding contact portion 59, which serves as a first sliding contact portion that extends unevenly to the front-end portion of insertion portion 58.

Insertion portion 58 includes axial support opening portions 58*a*, which are formed as notches obtained by cutting off upper and lower and left and right portions of insertion portion 58. Axial support opening portions 58*a* are each a louver bearing portion for axially supporting a corresponding one of louvers 47 turnably between insertion portion 58 and rear-side housing 52 inserted from rearward. In addition, insertion portion 58 includes multiple positioning openings 58*b*, which are provided for positioning and stopping rear-side housing 52, are formed by making notches at positions between axial support opening portions 58*a*.

The outer circumference portion of front-side sliding portion 59 also serves as sliding contact surface portion 59*a*, which is a part of the spherical surface in sliding contact with the inner circumference side of outer portion 15 (sliding contact surface 31*a*).

Bearing portion 55 is a portion where connection portion 46 is attached. Bearing portion 55 is formed in an annular shape on the center axis side of front-side outer frame portion 54 (front-side sliding contact portion 59), and preferably, is formed in a coaxial (concentric) annular shape. In other words, bearing portion 55 is formed so as to surround the central axis (axis center) of housing portion 45 (front-side housing 51). Moreover, multiple ribs 55*a* for positioning and turn-stopping are provided radially at the inner circumference portion of bearing portion 55 in a protruding manner towards the center axis side along the radial direction.

Connection ribs 56 are formed radially in an annular shape and connected to one another.

Rear-side housing 52 integrally includes: cylindrical (annular) rear-side outer frame portion 61, which serves as a second outer frame portion; axial support protruding portions 62, each of which serves as another louver bearing portion formed at the inner circumference portion of rear-side outer frame portion 61 in a protruding manner; and positioning protruding portions 63.

The outer circumference portion of rear-side outer frame portion 61 serves as sliding contact surface portion 61*a*, which is in sliding contact with the inner circumference side of outer portion 15 (sliding contact surface 31*a*) and which forms a part of the same spherical surface as sliding contact surface 59*a*. Annular (cylindrical) outer frame portion 65 is formed by placing front-side outer frame portion 54 under the inner circumference side of rear-side outer frame portion 61.

Axial support protruding portions 62 are provided respectively at the upper, lower, left and right positions of the inner circumference portion of rear-side outer frame portion 61 in a protruding manner and extend in the front and rear direction in parallel along the axis direction, i.e., extends linearly in a direction in which rear-side housing 52 is attached to front-side housing 51. Axial support protruding portions 62 are inserted into axial support opening portions 58*a* of front-side housing 51 from rearward, respectively. In other words, the gaps between the front ends of axial support protruding portions 62 and the front ends of axial support opening portions 58*a* each serve as circular outer-side axial support hole 67. Circular outer-side axial support holes 67 each serve as an outer-side axial support portion for axially supporting the outer side of a corresponding one of louvers 47 turnably.

Positioning protruding portions 63 are provided between axial support protruding portions 62 in a protruding manner and extend in the front and rear direction in parallel along the axis direction, i.e., extend linearly in the direction in which rear-side housing 52 is attached to front-side housing 51. Positioning protruding portions 63 are inserted into positioning openings 58*b* of front-side housing 51 from rearward, respectively, and provide positioning and turn-stopping for rear-side housing 52 with respect to front-side housing 51.

Moreover, connection portion 46 includes: knob 71, which is an operation unit turnable with respect to housing portion 45 (bearing portion 55); and spacer 72, which is a fixing unit fixed to housing portion 45 and is a unit separate from knob 71. Connection portion 46 is axially supported by outer portion 15 (rear-side outer portion 22 (assembly axial support portion 38)) via link unit 73, turnably.

Knob 71 includes: operation knob 75, which serves as an operation unit, and knob portion 76, which serves an actuator portion attached to operation knob 75 from rearward to hold spacer 72.

Operation knob 75 is a knob to be held by a user when the user operates knob 71, and is attached to housing portion 45 (front-side housing 51) from forward and protrudes forward from air outlet 27 so as to be externally operable. Operation knob 75 includes: operation knob main body 75*a*, which serves as an operation unit main body formed in a cylindrical shape with a lid and brought into contact with the front end of bearing portion 55; and bearing insertion portion 75*b*, which protrudes rearward coaxially from operation knob main body 75*a* to be inserted into bearing portion 55. Operation knob 75 is axially supported turnably in the circumferential direction with respect to bearing portion 55 (housing portion 45 (front-side housing 51)).

Bearing insertion portion 75*b* includes locking holes 75*c*, which are formed at positions facing each other with respect to the center axis so as to lock knob portion 76.

Knob portion 76 is inserted into spacer 72 from rearward and coupled to operation knob 75 to hold spacer 72 in between in the axis direction (front and rear direction) and is configured to turn integrally with operation knob 75. Knob portion 76 integrally includes: cylindrical bearing portion 76*a* to which bearing insertion portion 75*b* of operation knob 75 is inserted; flange portion 76*b*, which protrudes radially from the rear end of bearing portion 76*a* in a flange shape; and multiple projecting portions 76*c*, which are provided in a protruding manner from rearward of flange portion 76*b*. Knob portion 76 has an outer diameter dimension smaller than an inner diameter dimension of spacer 72 and an axial dimension smaller than an axial dimension of spacer 72 and is thus housed inside spacer 72.

Bearing portion 76*a* is a portion turnably inserted into spacer 72 and includes fitting claw portions 76*d*, which are formed at the inner circumferential portion in a protruding manner to be fitted to locking holes 75*c* of inserted bearing insertion portions 75*b*. Accordingly, knob portion 76 and operation knob 75 are integrally coupled to each other via fitting of claw portions 76*d* to locking holes 75*c*.

Retainer portions 76*e* are provided at the front surface portion of flange portion 76*b* in a protruding manner in a rib shape along the radial direction at the positions opposite to each other with respect to the center axis. Retainer portions 76*e* are brought into contact with spacer 72 to retain knob portions 76 from falling off in the forward direction. Accordingly, in knob 71, operation knob main body 75*a* of operation knob 75 is brought into contact with the front end of bearing portion 55, and spacer 72 is brought into contact with retainer portions 76*e* of knob portion 76 from rearward. Thus, the position of knob 71 in the axial direction (front and rear direction) with respect to housing portion 45 (front-side housing 51) is fixed.

Projecting portions 76*c* are set as many as the number of louvers 47. Accordingly, four projecting portions 76*c* are provided in the first embodiment. Projecting portions 76*c* are each formed in a curved arc shape at a position near the outer circumference of flange portion 76*b*, for example, and are equiangularly spaced from each other (are arranged at equal intervals) in the circumferential direction. Knob portion 76 and operation knob 75 are integrally coupled to each other so that projecting portions 76*c* follow the turn operation of knob 71 (operation knob 75) in the circumferential direction and turn in the circumferential direction.

Spacer 72 integrally includes: cylindrical connection portion 78; cylindrical spacer main body 79, which serves as a fixing unit main body extending to the rear end of connection portion 78; and axial support pieces 80, which are provided in a protruding manner to the rearward at the rear end of spacer main body 79, and which axially support link unit 73 turnably. Note that, spacer 72 may be integrally formed with bearing portion 55 of housing portion 45 (front-side housing 51).

Connection portion 78 is inserted into bearing portion 55 from rearward, and the front end of connection portion 78 is located at a more forward position than bearing portion 55 and inserted into operation knob main body 75*a* of operation knob 75 of knob 71. Turn-stopper ribs 78*a* between which one rib 55*a* of bearing portion 55 is inserted are provided in a protruding manner in parallel with each other in the axial direction at the outer circumference portion of connection portion 78. Moreover, multiple turn-stopper openings 78*b* into which other ribs 55*a* of bearing portion 55 are inserted respectively are formed in the circumference surface of connection portion 78 while being spaced from each other in the circumferential direction. Accordingly, rib 55*a* of bearing portion 55 is inserted between turn-stopper ribs 78*a* of connection portion 78, and ribs 55*a* of bearing portion 55 are respectively fitted to turn-stopper openings 78*b*. Thus, spacer 72 is fixed from turning in the circumferential direction with respect to housing portion 45 (front-side housing 51 (bearing portion 55)).

Spacer main body 79 is formed so as to have an outer diameter dimension larger than connection portion 78. Accordingly, the portion where connection portion 78 starts extending from spacer main body 79 is spacer stopper portion 83, which serves as a fixing unit lock portion that increases in diameter in a stepped manner. Moreover, circular inner-side axial support holes 84 and long-hole operation openings 85 are formed in the outer circumference portion of spacer main body 79. Inner-side axial support holes 84 each serve as an inner-side axial support portion for axially supporting the inner side of corresponding louver 47 turnably, and operation openings 85 are each provided for turning corresponding louver 47.

Spacer stopper portion 83 is brought into contact with the rear surface of bearing portion 55 to set the position of spacer 72 in the axial direction (front and rear direction) with respect to housing portion 45 (front-side housing 51 (bearing portion 55)).

Inner-side axial support holes 84 are formed as many as the number of louvers 47, i.e., four inner-side axial support holes 84 are formed at positions near the front end of spacer main body 79. Moreover, inner-side axial support holes 84 are equiangularly spaced from each other (are arranged at equal intervals) in the circumferential direction of spacer 72 (spacer main body 79). Furthermore, inner-side axial support holes 84 are positioned on the same virtual line along outer-side axial support holes 67 and the radial direction of housing portion 45 (direction intersecting with (orthogonal to) the center axis).

Operation openings 85 are formed as many as the number of louvers 47, i.e., four operation openings 85 are formed in the first embodiment at positions spaced from each other in the rearward of inner-side axial support holes 84 of spacer main body 79. In addition, each operation opening 85 is formed in a curved shape along a circular arc around corresponding inner-side axial support hole 84 (center of inner-side axial support hole 84). Moreover, each operation opening 85 is formed in a longitudinal shape along the circumferential direction of spacer 72 (spacer main body 79) while penetrating through spacer 72 (spacer main body 79) in the radial direction. In other words, the inner and outer circumference sides of spacer 72 (spacer main body 79) communicate with each other via operation openings 85. In addition, operation openings 85 are formed at positions corresponding to projection portions 76*c* of knob 71, respectively.

Axial support pieces 80 are formed at positions opposite to each other with respect to the center axis of spacer 72. In the first embodiment, axial support pieces 80 are formed in a protruding manner at the rearward positions of operation openings 85 facing each other. Circular axial support hole portions 80*a*, which axially support link unit 73, are formed in axial support pieces 80.

Link unit 73 includes first link axial support portions 87, which are axially supported by outer portion 15 (axial support holes 38*b* of assembly axial support portion 38 of rear-side outer portion 22) turnably at left and right positions, respectively. Moreover, link unit 73 includes second link axial support portions 88, which are turnably inserted into louver assembly 16 (axial support holes 80*a* of spacer 72) to axially support louver assembly 16 (axial support holes 80*a* of spacer 72) at upper and lower ends of link unit 73, respectively. As described above, link unit 73 is formed in a cross shape. In other words, link unit 73 is turnable in the up and down direction with respect to outer portion 15 and axially support louver assembly 16 (spacer 72) turnably in the left and right direction intersecting with (orthogonal to) this up and down direction. Accordingly, link unit 73 makes entire louver assembly 16 (spacer 72) turnable in any direction of the up, down, left and right directions with respect to outer portion 15.

Each louver 47 is also called a fin and includes: plate-shaped louver main body 91, which controls the wind direction; pin-shaped outer-side turning axis 92, which is provided in a protruding manner from louver main body 91; inner-side turning axis 93; and actuator axis 94.

Louver main body 91 is positioned in housing portion 45, i.e., a flow passage between outer frame portion 65 of housing portion 45 and spacer 72, and extends in the rearward, i.e., the windward side with reference to turning axes 92 and 93 being the front end side. In addition, the rear end portion of louver main body 91 is inclined portion 91*a*, which is inclined gradually forward from outer frame portion 65 towards spacer 72. Note that, louver main body 91 is capable of increasing the spreading range in the spreading mode as the front and rear width of louver main body 91 increases, and is capable of suppressing a larger amount of ventilation resistance in the spreading mode as the front and rear width of louver main body 91 is reduced. For this reason, the front and rear width of louver main body 91 is set in accordance with a required spreading range and ventilation resistance.

Outer-side turning axis 92 is provided at an outer-side front-end position of louver main body 91, i.e., a position facing outer frame portion 65 so as to protrude in a direction intersecting with (orthogonal to) the thickness direction of louver main body 91 and is axially supported by outer-side axial support hole 67 turnably.

Inner-side turning axis 93 is provided at an inner-side front-end position of louver main body 91, i.e., a position facing spacer 72 so as to protrude in the direction intersecting with (orthogonal to) the thickness direction of louver main body 91 and is axially supported by inner-side axial support hole 84 turnably. Moreover, inner-side turning axis 93 is positioned coaxially with outer-side turning axis 92 and provided at the front end of louver main body 91. Accordingly, louvers 47 (louver main bodies 91) are arranged radially along the radial direction of housing portion 45 at the positions of outer-side turning axes 92 and inner-side turning axes 93.

Actuator axis 94 is provided in a protruding manner at a position of each louver main body 91 that faces the outer circumference surface of spacer 72 of and that is apart from inner-side turning axis 93 in the rearward direction. In addition, actuator axis 94 is provided in a protruding manner in the direction intersecting with (orthogonal to) the thickness direction of louver main body 91, i.e., in a direction substantially in parallel with inner-side turning axis 93. In other words, inner-side turning axis 93 is formed a more forward (leeward side) position than actuator axis 94. Moreover, each actuator axis 94 is loosely fitted into corresponding operation opening 85 and is movable along operation opening 85. Furthermore, actuator axis 94 protrudes towards the inner side of spacer 72 from operation opening 85 and is inserted and positioned between projecting portions 76*c* of knob 71 and thus held between projecting portions 76*c*. Accordingly, actuator axes 94 are configured to be turnable in such a way that the rear-side portions of louver main bodies 91 of louvers 47 are inclined in the circumferential direction around turning axes 92 and 93 when pushed by projecting portions 76*c* turned by a turning operation of knob 71.

When building wind direction adjuster 10, knob portion 76 is inserted from the rear of spacer 72. During the insertion, inner-side turning axes 93 and actuator axes 94 are inserted into inner-side axial support holes 84 and operation openings 85 to attach louvers 47 to spacer 72. In this state, actuator axes 94 are each inserted and held between projecting portions 76*c* inside spacer 72.

Next, spacer 72, knob portion 76 and louvers 47 are placed and held between housings 51 and 52 in the front and rear direction. In other words, connection portion 78 of spacer 72 is inserted into bearing portion 55 of front-side housing 51 from rearward. During the insertion, axial support protruding portions 62 and positioning protruding portions 63 of rear-side housing 52 are fitted to axial support openings 58*a* and positioning openings 58*b* of front-side housing 51 from rearward to couple housings 51 and 52 with each other. Thus, housing portion 45 is formed in this manner. In this state, ribs 55*a* of bearing portion 55 are each inserted between turn-stopper ribs 78*a*, and ribs 55*a* of bearing portion 55 are fitted respectively to turn-stopper openings 78*b*, thereby fixing spacer 72 to bearing portion 55. In addition, outer-side turning axes 92 of louvers 47 are axially supported turnably by outer-side axial support holes 67 between axial support openings 58*a* and axial support protruding portions 62 of housing portion 45.

Moreover, operation knob 75 is assembled to bearing portion 55 of front-side housing 51 from forward to connect knob portion 76 and thus to configure louver assembly 16. Furthermore, second link axial support portions 88 of link unit 73 are assembled to axial support holes 80*a* of axial support pieces 80 of spacer 72. In this state, operation knob 75 is integrally coupled to knob portion 76 while bearing insertion portion 75*b* is inserted into bearing portion 76*a* of knob portion 76, and fitting claw portions 76*d* are fitted to locking holes 75*c*.

First link axial support portions 87 of link unit 73 are assembled to axial support holes 38*b* of assembly axial support portion 38 of rear-side outer portion 22 to axially support louver assembly 16 by rear-side outer portion 22 turnably in the up and down direction. Assembling is continued in which turn-stopper protruding portions 35*a* and locking claw portions 35*b* of rear-side outer portion 22 are inserted into turn-stopper portions 32*a* and locking holes 32*b* of front-side outer portion 21 to configure outer portion 15. Moreover, finisher 26 is attached to outer wall portion 24 of outer portion 15 from forward. Thus, wind direction adjuster 10 is complete.

Figure 1:
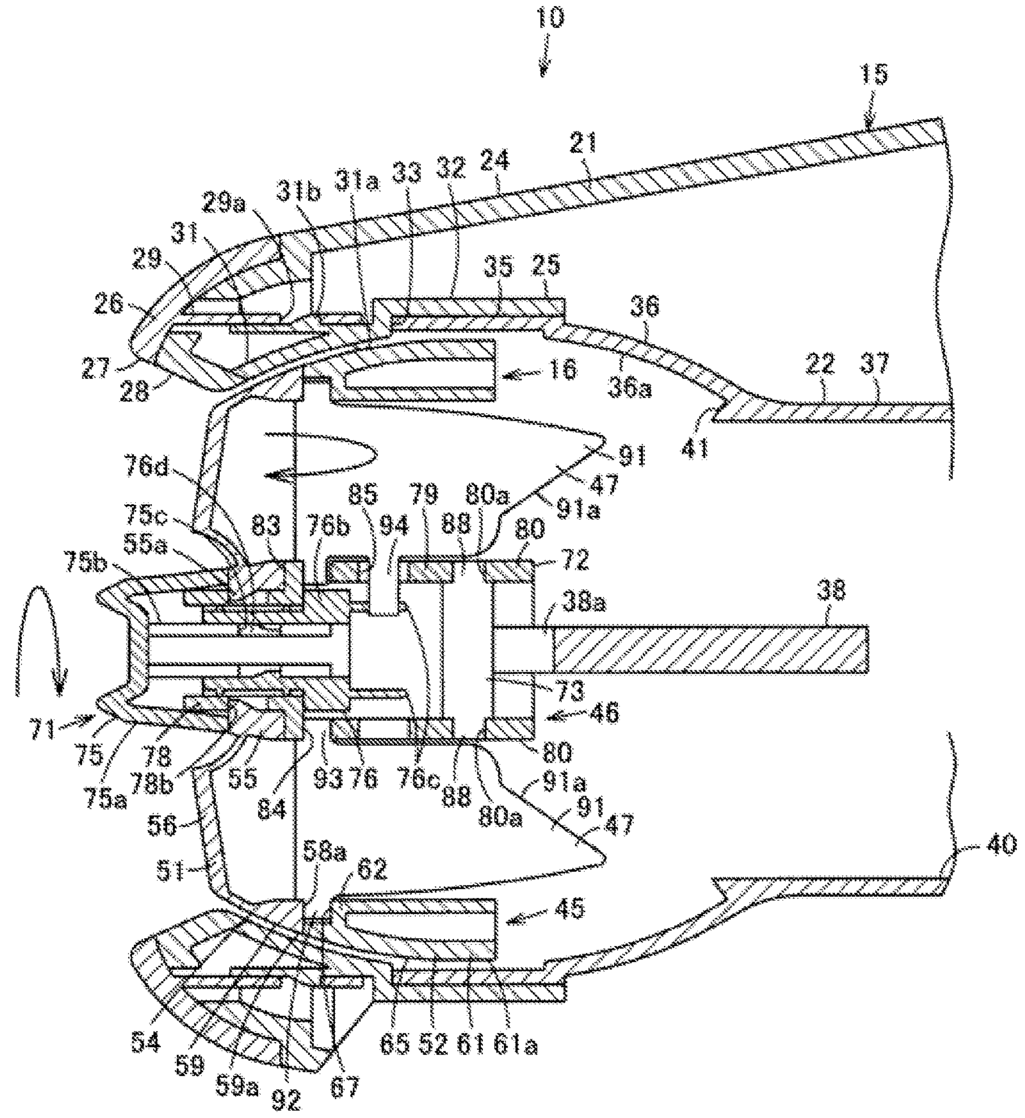
FIG. 1 is a vertical cross-sectional view of a wind direction adjuster according to a first embodiment of the present invention.
Figure 2A:
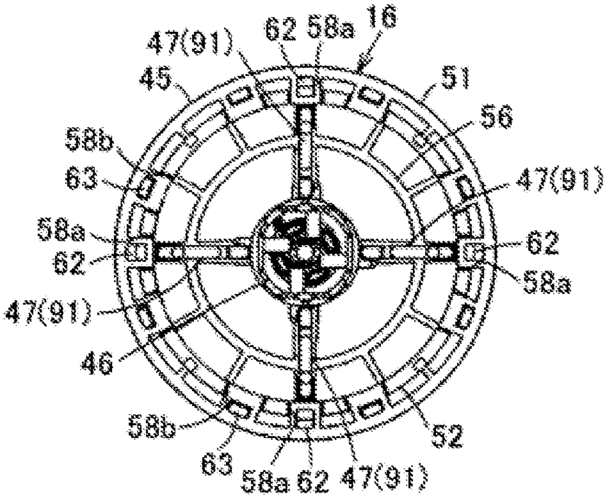
FIG. 2A is a front view of the wind direction adjuster in a concentration mode as viewed from a windward side.
Figure 2B:
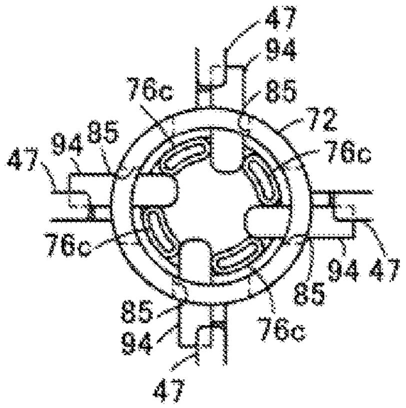
FIG. 2B is an enlarged view of a center portion of the wind direction adjuster in the concentration mode as illustrated in FIG. 2A.
Figure 3A:
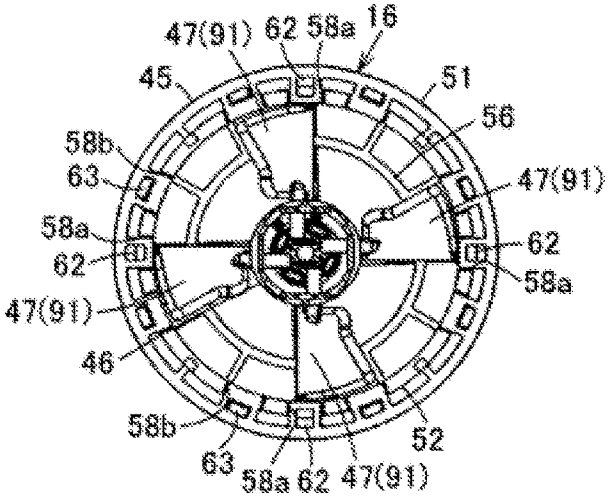
FIG. 3A is a front view of the wind direction adjuster in a spreading mode as viewed from the windward side.
Figure 3B:
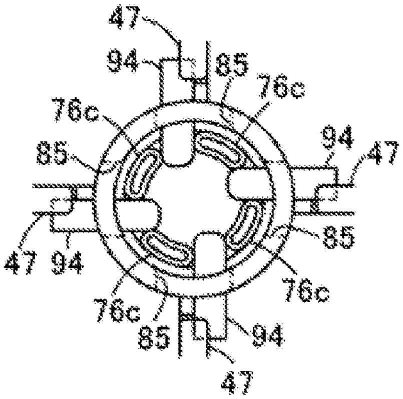
FIG. 3B is an enlarged view of a center portion of the wind direction adjuster in the spreading mode as illustrated in FIG. 3A.
Figure 4A:
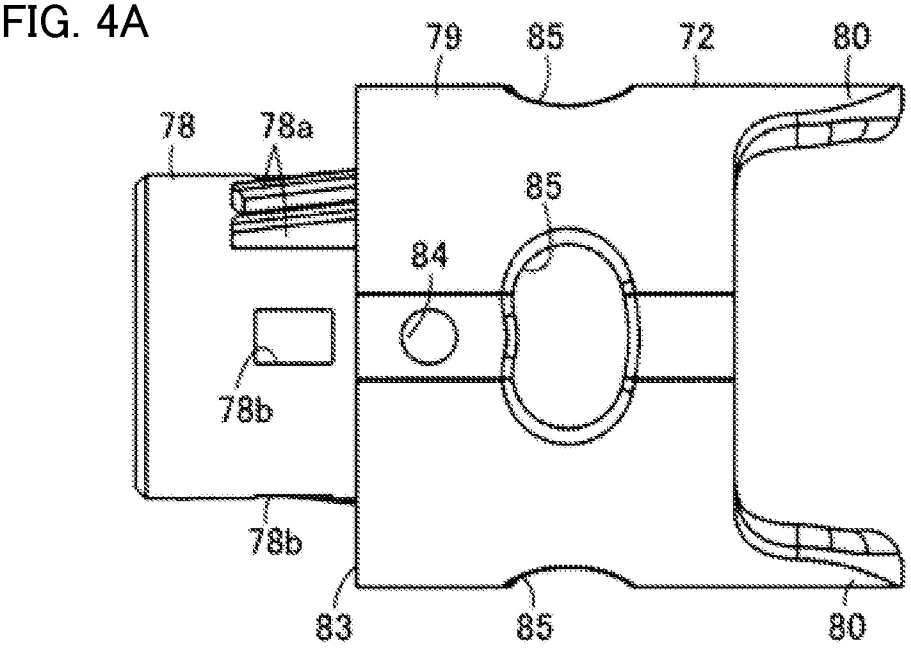
FIG. 4A is a plan view of a fixation unit of the wind direction adjuster.
Figure 4B:
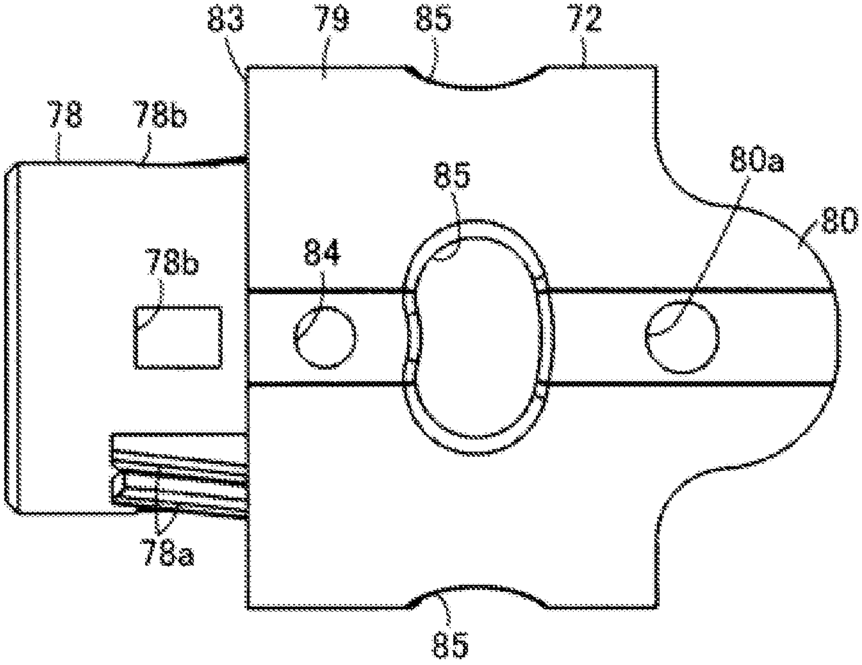
FIG. 4B is a side view of the fixation unit of the wind direction adjuster.
Figure 5:
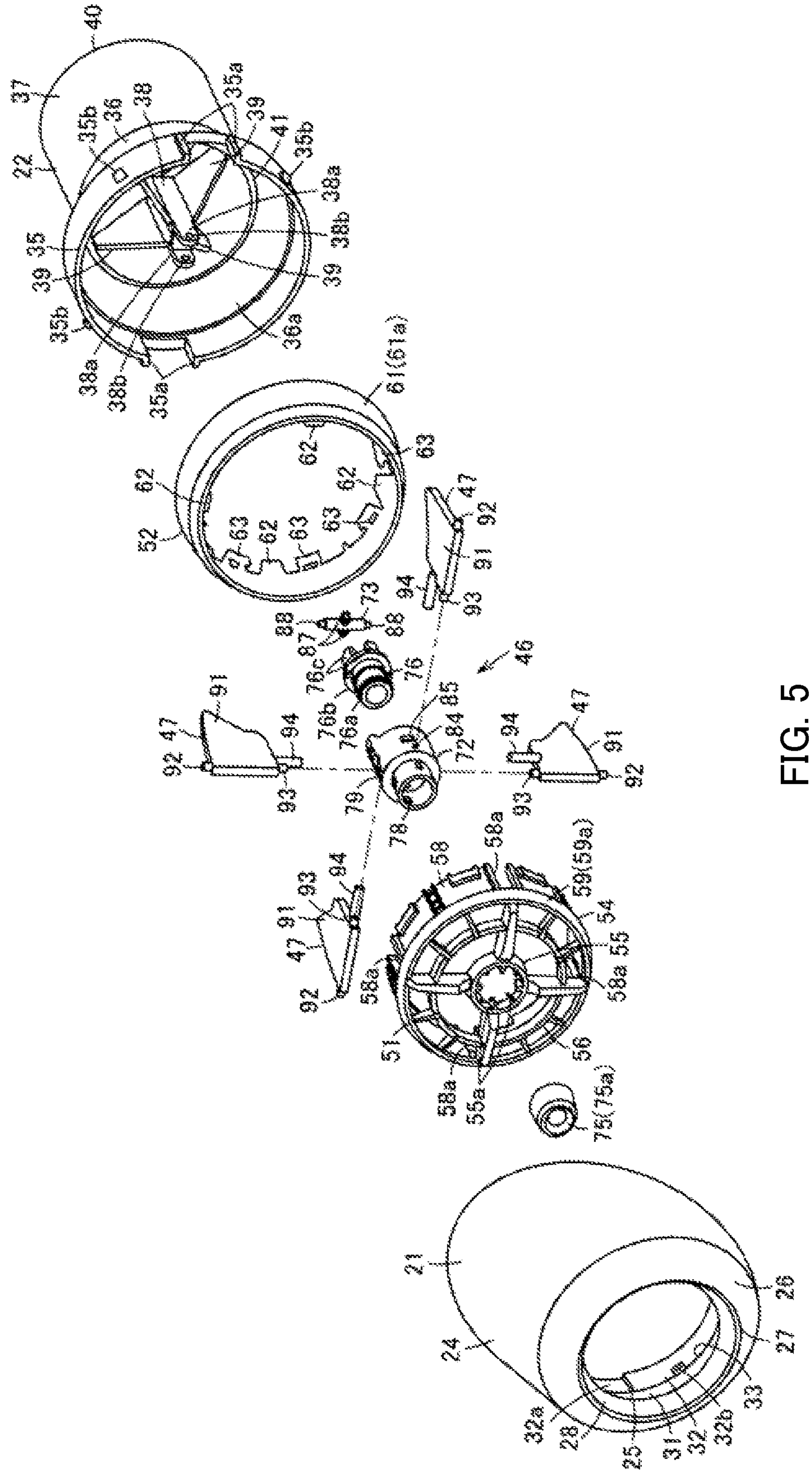
FIG. 5 is an exploded perspective view of the wind direction adjuster from a leeward side.
Figure 6:
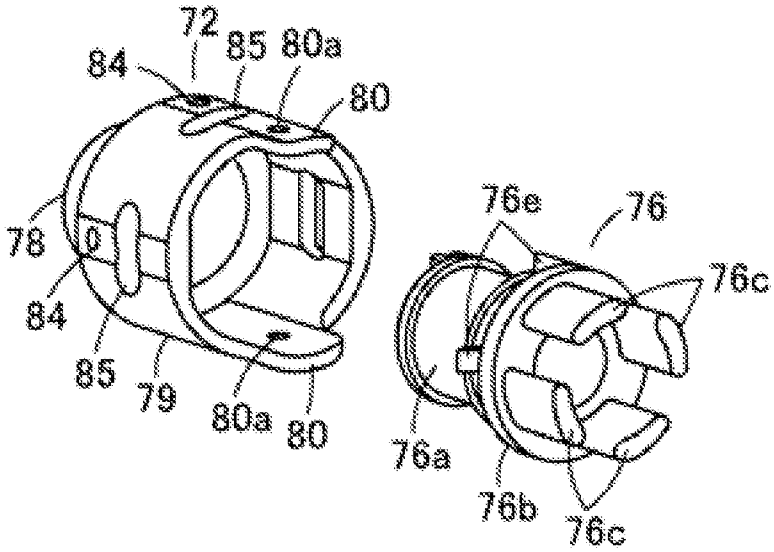
FIG. 6 is a perspective view of a part of the wind direction adjuster from a windward side.

In wind direction adjuster 10, which is built in the manner described above, holding operation knob 75 of knob 71, which is exposed from wind outlet 27, and turning operation knob 75 in the up, down, left and right directions allows louver assembly 16 (housing portion 45) to optionally turn in the up, down, left and right directions with respect to outer portion 15. Moreover, turning operation knob 75 of knob 71 in the circumferential direction clockwise or counter-clockwise allows wind direction adjuster 10 to operate louvers 47 and to switch between the concentration mode for concentrating wind as illustrated in FIGS. 2A and 2B and the spreading mode for spreading wind as illustrated in FIGS. 3A and 3B.

During the concentration mode, projecting portions 76*c* provided in a protruding manner at knob portion 76, which is coupled to operation knob 75 of knob 71 turned in one direction, turn in synchronization in the turning direction of knob 71 (operation knob 75). This turning of projecting portions 76*c* pushes and moves actuator axes 94 of louvers 47 held between projecting portions 76*c*, along operation openings 85 in one direction of operation openings 85. Actuator axes 94 are placed at positions opposite to the rear parts of turning axes 92 and 93 so that entire louver main bodies 91 (both side surfaces of louver main bodies 91) of louvers 47 are arranged radially along the radial direction of housing portion 45. More specifically, louver main bodies 91 let the wind introduced into the flow passage from introduction port 40 via a blower of an air conditioner pass through straight along the axis direction of louver assembly 16 (housing portion 45) basically without changing the direction of the wind. Accordingly, the wind blows forward from wind outlet 27 in wind direction adjuster 10.

Meanwhile, in the spreading mode, projecting portions 76*c* provided in a protruding manner at knob portion 76, which is coupled to operation knob 75 of knob 71 turned in the other direction, turn in synchronization with the turning direction of knob 71 (operation knob 75). This turning of projecting portions 76*c* pushes and moves actuator axes 94 of louvers 47 held between projecting portions 76*c*, along operation openings 85 in the other direction of the operation openings 85. Actuator axes 94 are placed at positions laterally shifted from (not opposite to) the rear parts of turning axes 92 and 93 so that louver main bodies 91 (both side surfaces of louver main bodies 91) of louvers 47 turn (tilt) in the same direction inclining with respect to the front and rear direction which is the axis direction of housing portion 45 and thus proceed. Accordingly, the wind spreads along louver main bodies 91 of louvers 47 and blows out from wind outlet 27.

As described above, in the first embodiment, the configuration is employed in which inner-side turning axes 93 provided at louver main bodies 91 in a protruding manner are axially supported by inner-side axial support holes 84 provided in spacer 72. In addition, spacer 72 is fixed to bearing portion 55 provided towards the center axis of tube-shaped (cylindrical) outer frame portion 65 of housing portion 45, which has an inner side serving as a flow passage. Meanwhile, actuator axes 94 provided in a protruding manner at positions apart from inner-side turning axes 93 in louver main bodies 91 are inserted into operation openings 85 provided in spacer 72. Thus, louvers 47 are configured to move when actuator axes 94 are pushed by projecting portions 76*c* by turning of projecting portions 76*c* in association with turning of an external operation of knob 71 turnable with respect to bearing portion 55 and spacer 72.

As a result, it is made possible to move multiple louvers 47 in conjunction with each other with a simple configuration and without using a precision component such as a gear for coupling knob 71 and each louver 47 together and thus to downsize the coupling structure of knob 71, spacer 72, and louvers 47. Thus, components can be formed without much work and incorporation of the components (assembly) is easy. For this reason, it is possible to suppress manufacturing costs and to easily design wind direction adjuster 10 while reducing the ventilation resistance and improving the degree of freedom for design and layout as wind direction adjuster 10.

Moreover, outer-side turning axes 92 provided at louver main bodies 91 of louvers 47 in a protruding manner are axially supported by outer-side axial holes 67 provided in outer frame portion 65. Thus, louvers 47 can be surely supported and more smoothly turned with respect to outer frame portion 65.

More specifically, housing portion 45 is formed by front-side housing 51 and rear-side housing 52. Outer-side turning axes 92 are placed between axial support openings 58*a* of front-side housing 51 and axial support protruding portions 62 of rear-side housing 52 in the front and rear direction and axially supported by outer-side axial holes 67. In this manner, housing portion 45 can be easily built. Moreover, knob 71 can be easily built by holding spacer 72 between operation knob 75 and knob portion 76 and attaching the components to bearing portion 55.

In each louver 47, inner-side turning axis 93 is provided at a more leeward (front side) position than actuator axis 94. Thus, during the spread mode, for example, the windward side portions of louvers 47, i.e., the rear portions of louvers 47 which are distant from wind outlet 27 tilt so as to proceed to the inner side of the flow passage. Accordingly, louvers 47 (louver main bodies 91) are unlikely to be seen by passengers and thus further improved in appearance.

Moreover, link unit 73 is axially supported turnably in the up and down direction that is a predetermined reciprocating direction with respect to outer portion 15 configured to house housing portion 45, and spacer 72 is axially supported turnably in the left and right direction that is another reciprocating direction with respect to link unit 73. Thus, spacer 72, and housing portion 45 in which spacer 72 is fixed to bearing portion 55, and louver assembly 16 can oscillate in an optional direction, and the oscillation angle of housing portion 45 (louver assembly 16) can be larger.

(Second Embodiment)

Next, a description will be given of a second embodiment with reference to FIGS. 8 through 15. Note that, the components and effects identical to those of the first embodiment are assigned the same reference numerals and the description of these components and effects will not be repeated.

In the second embodiment, spacer main body 79 of spacer 72 according to the first embodiment is formed in a square tube shape. Long-hole shaped operation openings 85 are formed along with the circumferential direction of spacer 72 so as to curve concentrically with inner-side axial support holes 84 at front side positions that are leeward side positions of inner-side axial support holes 84 formed in the respective surfaces of spacer main body 79. Bearing portions 102 for attaching cover 101, which serves as a blow-by protection body configured to protect wind from blowing out of spacer 72, are made by forming notches at the left and right sides of the rear end portion of spacer main body 79.

Cover 101 integrally includes: cover main body 104, which serves as a square plate-shaped protection unit main body; and tongue piece-shaped holding target pieces 105, which protrude from both sides of cover main body 104 and are fittingly fixed to bearing portions 102, respectively, (only one of holding target tongue pieces 105 is illustrated). Cover 101 is fixed to a more forward position than link unit 73 in the rear portion of spacer 72, and cover main body 104 covers the rear end of spacer main body 79, thereby preventing the wind inside cover main body 104 (cover 101) from blowing out.

Moreover, louvers 47 each include louver main body 91, which is formed in a longitudinal shape. Louver main body 91 includes: inner-side turning axis 93, which is formed at a substantially center position in the longitudinal direction of louver main body 91 in a protruding manner; and actuator axis 106, which is provided, instead of actuator axes 94, at louver main body 91 in a protruding manner at a position spaced from inner-side turning axis 93 towards a more leeward side, i.e., more front side than inner-side turning axis 93.

Louver main body 91 is formed in a shape capable of blocking the flow passage in housing portion 45 substantially without any gap when placed at an outer side of spacer main body 79 of spacer 72 in a planar shape. In other words, louver assembly 16 is capable of successively switching between a concentration mode for concentrating the wind in a predetermined direction (neutral mode), a spreading mode for spreading the wind, and a blocking mode for blocking the inside of housing portion 45 (shut mode) by operating louvers 47 in conjunction with each other by coupling portion 46.

Actuator axes 106 each integrally include: protruding portion 106*a*, which protrudes from a lateral portion of louver main body 91 in the thickness direction (lateral direction) of louver main body 91; and coupling portion 106*b*, which extends from the leading end of protruding portion 106*a* and is bent to form substantially a right angle shape; and insertion axis portion 106*c*, which extends from the end of coupling portion 106*b* and is bent to form an obtuse angle with respect to coupling portion 106*b*. More specifically, actuator axis 106 is formed in a shape similar to a right square bracket. Actuator axis 106 includes protruding portion 106*a*, coupling portion 106*b* and insertion axis portion 106*c*, which are disposed along substantially a straight line following the up and down direction as viewed in the thickness direction of louver main body 91 (i.e., direction indicated by arrow A in FIG. 12).

Protruding portion 106*a* protrudes from louver main body 91 substantially in a perpendicular direction, and for example, protrudes by a thickness greater than the thickness of louver main body 91.

Coupling portion 106*b* extends towards the center axis of housing portion 45, which is a direction towards knob 71 (knob portion 76) from protruding portion 106*a*, i.e., coupling portion 106*b* extends linearly towards the inner side of housing portion 45 from louver main body 91. In other words, coupling portion 106*b* is formed substantially in parallel with inner-side turning axis 93.

Insertion axis portion 106*c* is bent towards knob 71 (knob portion 76) so as to fold back in the thickness direction of louver main body 91 from the end portion of coupling portion 106*b*. Insertion axis portion 106*c* is inserted between projecting portions 76*c* of knob portion 76 from operation opening 85 and held between projecting portions 76*c* substantially without any gap. Accordingly, insertion axis portion 106*c* is inserted between projecting portions 76*c* substantially along the radial direction of knob 71 (knob portion 76).

In wind direction adjuster 10, operation knob 75 of knob 71, which is exposed from wind outlet 27, is turned clockwise or counter-clockwise in the circumferential direction to operate louvers 47. Thus, wind direction adjuster 10 switches between a concentration mode for concentrating the wind as illustrated in FIGS. 9A and 9B, a spreading mode for spreading the wind as illustrated in FIGS. 10A and 10B, and a blocking mode for blocking the wind as illustrated in FIGS. 11A and 11B.

Figure 9A:
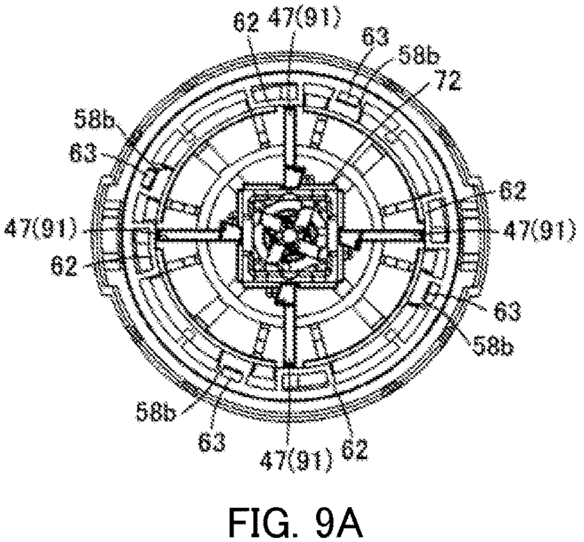
FIG. 9A is a front view of the wind direction adjuster in a concentration mode as viewed from a windward side.
Figure 9B:
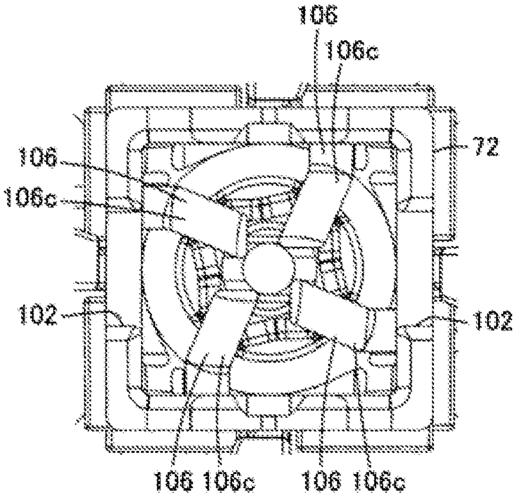
FIG. 9B is an enlarged view of a center portion of the wind direction adjuster in the concentration mode as illustrated in FIG. 9A.

During the concentration mode illustrated in FIGS. 9A and 9B, projecting portions 76*c* provided in a protruding manner at knob portion 76, which is coupled to operation knob 75 of knob 71 turned in one direction, turn in synchronization with the turning direction of knob 71 (operation knob 75). This turning of projecting portions 76*c* pushes and moves insertion axis portions 106*c* of actuator axes 106 of louvers 47 held between projecting portions 76*c*, along operation openings 85 in one direction of operation openings 85. Actuator axes 106 are thus placed in a positional relationship where actuator axes 106 each protrude to form a shape similar to a right square bracket towards one side direction of louver 47 as viewed in the front and rear direction, and entire louver main bodies 91 (side surfaces of louver main bodies 91) of louvers 47 are arranged radially along the radial direction of housing portion 45. More specifically, louver main bodies 91 let the wind introduced into the flow passage from introduction port 40 pass through straight along the axis direction of louver assembly 16 (housing portion 45) basically without changing the direction of the wind. Accordingly, the wind blows forward from wind outlet 27 in wind direction adjuster 10.

Figure 10A:
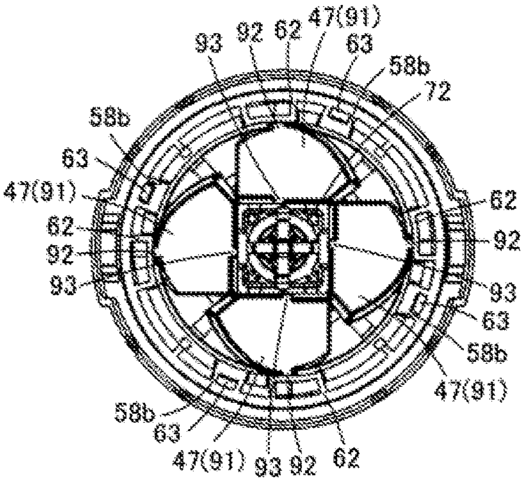
FIG. 10A is a front view of the wind direction adjuster in a spreading mode as viewed from the windward side.
Figure 10B:
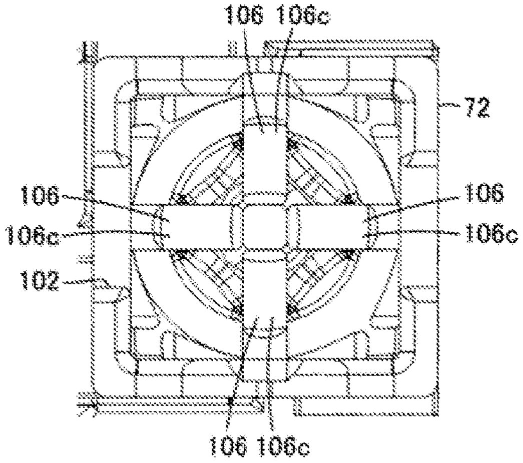
FIG. 10B is an enlarged view of a center portion of the wind direction adjuster in the spreading mode as illustrated in FIG. 10A.

Meanwhile, during the spreading mode illustrated in FIGS. 10A and 10B, projecting portions 76*c* provided in a protruding manner at knob portion 76, which is coupled to operation knob 75 of knob 71 turned in the other direction, turn in synchronization with the turning direction of knob 71 (operation knob 75). This turning of projecting portions 76*c* pushes and moves insertion axis portions 106*c* of actuator axes 106 of louvers 47 held between projecting portions 76*c*, along operation openings 85 in the other direction of operation openings 85. Louver main bodies 91 (both side surfaces of louver main bodies 91) of louvers 47 turn (tilt) in the same direction inclining with respect to the front and rear direction which is the axis direction of housing portion 45. Accordingly, the wind spreads along louver main bodies 91 of louvers 47 and blows out from wind outlet 27.

Figure 11A:
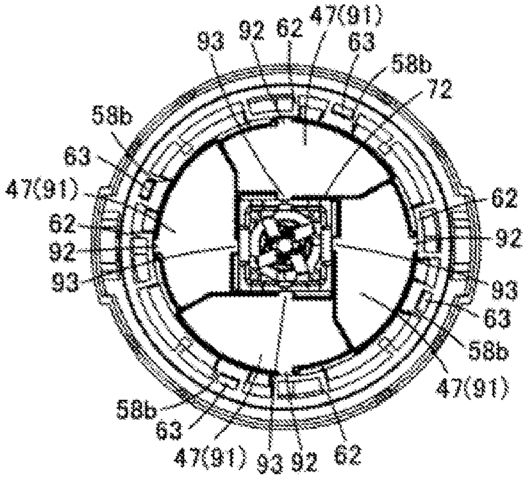
FIG. 11A is a front view of the wind direction adjuster in a blocking mode as viewed from a windward side.
Figure 11B:
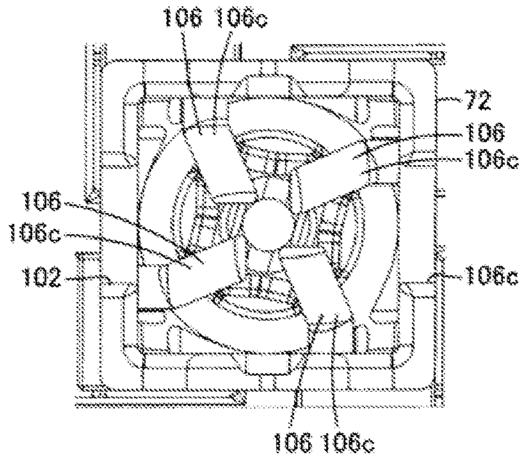
FIG. 11B is an enlarged view of a center portion of the wind direction adjuster in the blocking mode as illustrated in FIG. 11A.
Figure 12:
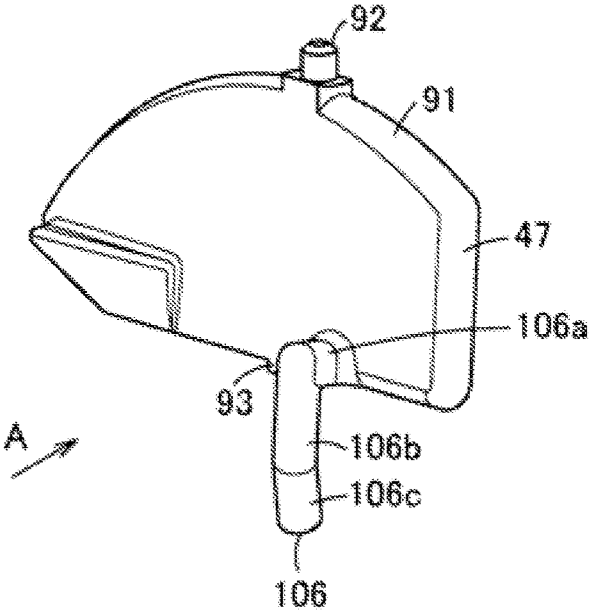
FIG. 12 is a perspective view of a louver of the wind direction adjuster.
Figure 14:
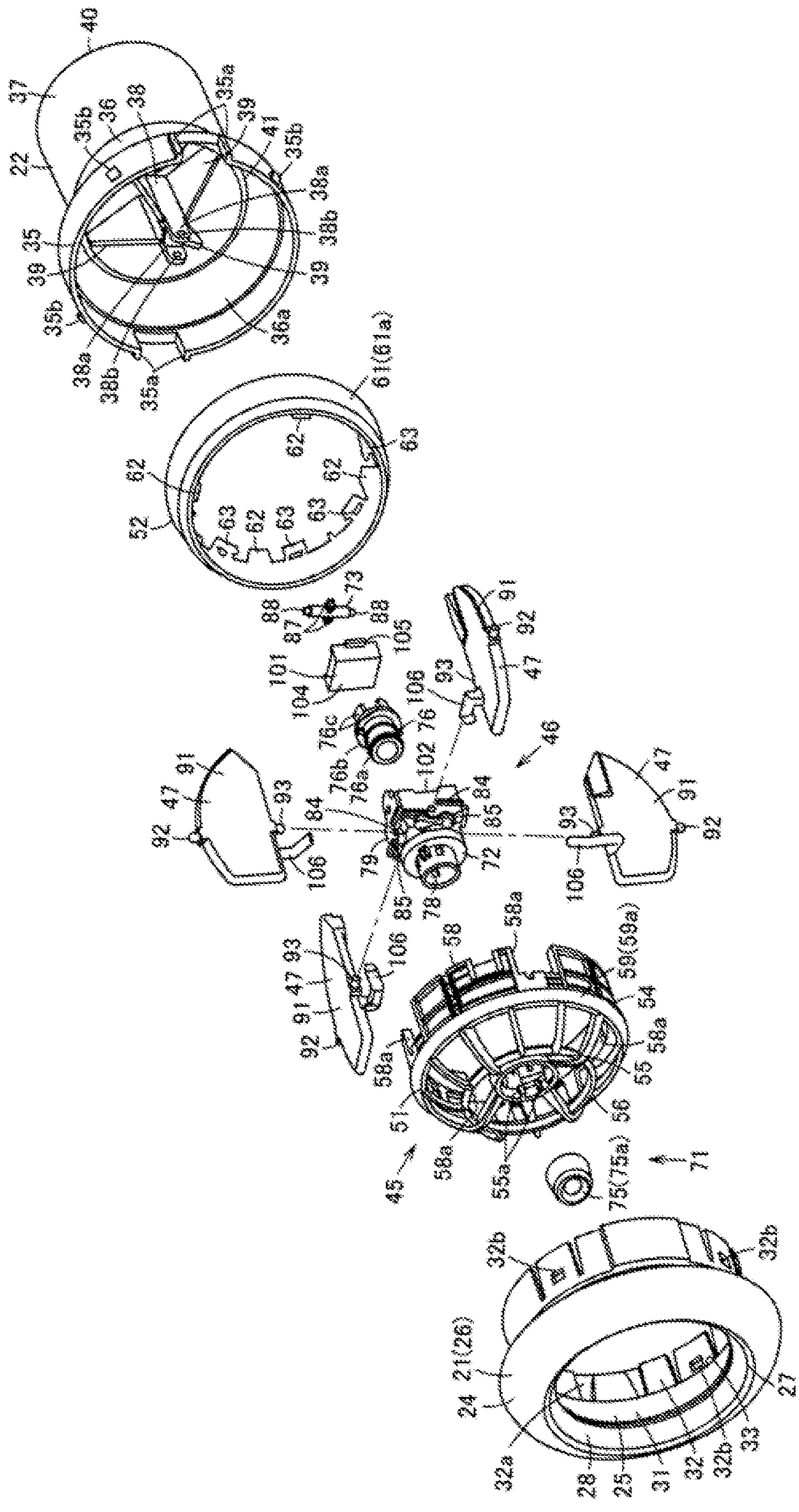
FIG. 14 is an exploded perspective view of the wind direction adjuster as viewed from the leeward side.
Figure 15:
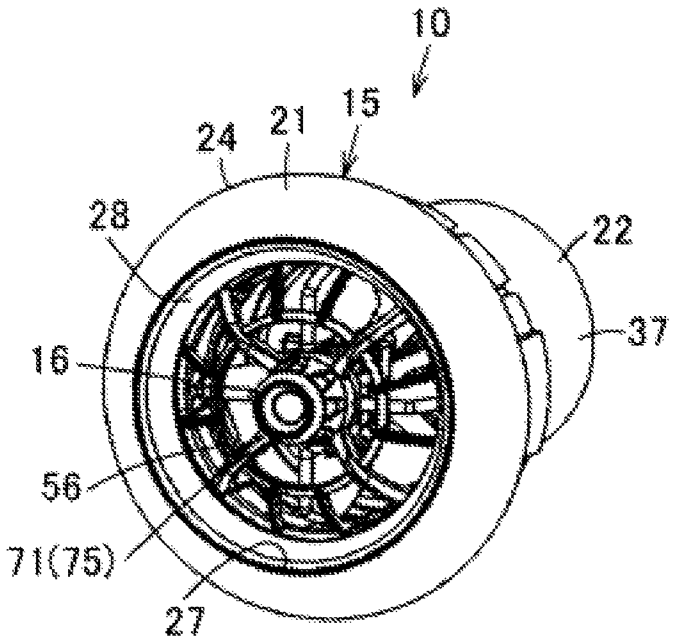
FIG. 15 is a perspective view of the wind direction adjuster.

Moreover, during the blocking mode illustrated in FIGS. 11A and 11B, knob 71 is turned further in the other direction from the state in the spreading mode illustrated in FIGS. 10A and 10B. This turning of projecting portions 76*c* pushes and moves insertion axis portions 106*c* of actuator axes 106 of louvers 47 held between projecting portions 76*c* of knob 71 along operation openings 85 towards the other ends of operation openings 85. Louver main bodies 91 (both side surfaces of louver main bodies 91) of louvers 47 turn (tilt) in the same direction substantially orthogonal to the front and rear direction that is the axis direction of housing portion 45 until actuator axes 106 and turning axes 92 and 93 are in the left and right positional relationship (positioned in the circumferential direction of housing portion 45). In other words, louver main bodies 91 turn until actuator axes 106 are positioned linearly along the up and down direction in the other side direction of turning axes 92 and 93 as viewed in the front and rear direction. More specifically, all louvers 47 are placed along the flat surface substantially orthogonal to the axis direction of housing portion 45, and blocks the flow passage in housing portion 45. Thus, the wind is blocked and does not blow out from wind outlet 27.

As described above, in the second embodiment, it is made possible to move multiple louvers 47 in conjunction with each other with a simple configuration and without using a precision component such as a gear for coupling knob 71 and each louver 47 together and thus to downsize the coupling structure of knob 71, spacer 72, and louvers 47. Thus, components can be formed without much work and incorporation of the components (assembly) is easy. For this reason, it is possible to suppress manufacturing costs and to easily design wind direction adjuster 10 while reducing the ventilation resistance and improving the degree of freedom for design and layout as wind direction adjuster 10. Thus, the same operational effects as those of the first embodiment described above can be obtained.

In addition, providing inner-side turning axis 93 at a more windward (front side) position than actuator axis 106 in each louver 47 makes it possible to increase the turning ranges of louver 47 and louver main body 91 and to completely close (block) the flow passage in housing portion 45 by louvers 47 and louver main bodies 91.

The turning range of each louver 47 (louver main body 91) increases as the distance between actuator axis 106 and turning axes 92 and 93 increases. Meanwhile, regarding coupling portion 46, since link unit 73 is placed at a windward position, placing turning axes 92 and 93 at leeward positions with respect to actuator axis 106 makes it difficult to secure a sufficient space for actuator axis 106 to be distant from turning axes 92 and 93. In an attempt to secure such a sufficient space, link unit 73 needs to be placed at a position further shifted to a windward side, which increases coupling portion 46 (spacer 72) and housing portion 45 in size in the front and rear direction. As a result, outer portion 15 configured to house housing portion 45, which turns around link unit 73, also increases in size.

In this respect, each inner-side turning axis 93 is formed at a more windward position than actuator axis 106. Thus, it is possible to secure a space for actuator axis 106 and inner-side turning axis 93 to be distant from each other without any change in the position of link unit 73. More specifically, it is made possible to increase the turning ranges of louvers 47 and louver main bodies 91 without any increase in sizes of coupling portion 46 (spacer 72), housing portion 45 and outer portion 15, i.e., any increase in size of wind direction adjuster 10.

Moreover, each actuator axis 106 includes: protruding portion 106*a*, which protrudes in the thickness direction from louver main body 91; coupling portion 106*b*, which is bent from protruding portion 106*a* towards knob 71 (knob portion 76); and insertion axis portion 106*c*, which is bent towards knob 71 (knob portion 76) so as to fold back in the thickness direction of louver main body 91 from the end portion of coupling portion 106*b*. This configuration enables suppressing a change in the insertion angle of insertion axis portion 106*c* between projecting portions 76*c* in association with turning of louver 47, and enables setting a small distance for distance D between projecting portions 76*c*, thus making it possible to suppress the size of knob 71 (knob portion 76) and to further downsize wind direction adjuster 10.

More specifically, in the case of liner actuator axes 108*a* illustrated in FIGS. 13A2 and 13B2, or in the case of right-angled shape actuator axes 108*b* illustrated in FIGS. 13A3 and 13B3, during the concentration mode or spreading mode (blocking mode), actuator axes 108*a* and 108*b* are inserted obliquely along a direction intersecting with the radial direction between projecting portions 76*c*1 and between projecting portions 76*c*2, for example. More specifically, the insertion angles of actuator axes 108*a* and 108*b* between projecting portions 76*c*1 and between projecting portions 76*c*2 in association with turning of louvers 47 change to a large extent. For this reason, it is required to secure a large distance for each of distances Da and Db between projecting portions 76*c*1 and between projecting portions 76*c*2 for the thicknesses of actuator axes 108*a* and 108*b*. As a result, gap G is formed between actuator axis 108*a* and projecting portions 76*c*1 and between actuator axis 108*b* and projecting portions 76*c*2 (see, FIGS. 13A2 and 13B3) depending on the turning angle of louver 47 (knob 71 (knob portion 76)). In addition, in order to increase distances Da and Db, knob 71 (knob portion 76) increases in size.

In this respect, in the second embodiment, the leading end side of actuator axis 106 is further bent to form insertion axis portion 106*c*. Thus, even during the concentration mode illustrated in FIG. 13A1, or the spreading mode or blocking mode illustrated in FIG. 13B1, the state where insertion axis portion 106*c* is inserted between projecting portions 76*c* substantially along the radial direction by turning of louver 47 is kept. Accordingly, distance D between projecting portions 76*c* can be set to have a distance substantially equal to the thickness of insertion axis portion 106*c*, and insertion axis portion 106*c* can be held without any gap in any mode, i.e., without rattling during any mode. More specifically, the operability and quality of wind direction adjuster 10 can be improved, and there is no need to increase the size of knob 71 (knob portion 76), and wind direction adjuster 10 can be further downsized.

(Third Embodiment)

Next, a description will be given of a third embodiment with reference to FIGS. 16 through 23. Note that, the components and effects identical to those of the first or the second embodiment are assigned the same reference numerals and the description of these components and effects will not be repeated.

In the third embodiment, ventilation openings 110 are formed respectively in louvers 47 (louver main bodies 91) according to the second embodiment.

Figure 20:
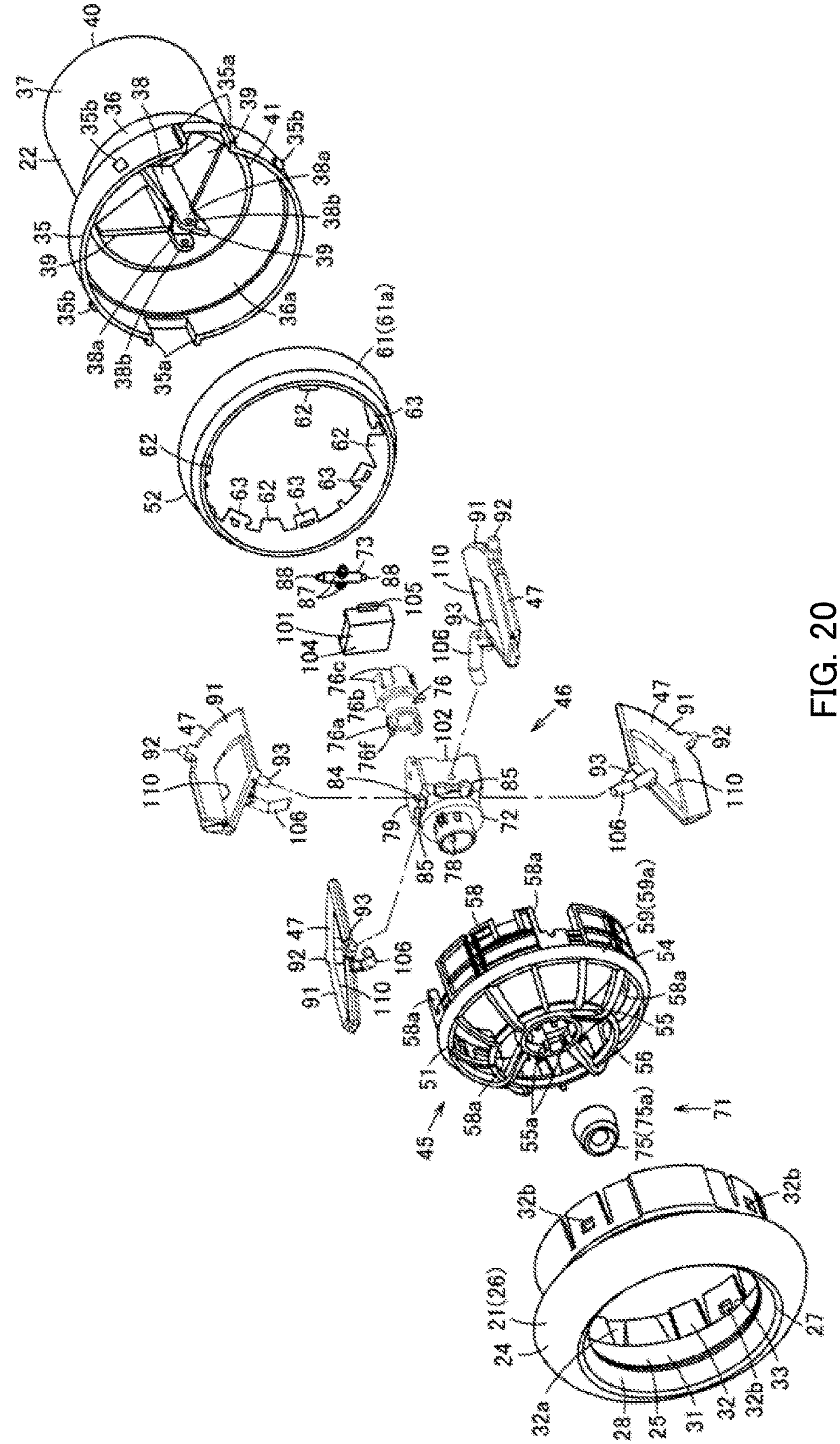
FIG. 20 is an exploded perspective view of the wind direction adjuster as viewed from the leeward side.
Figure 22:
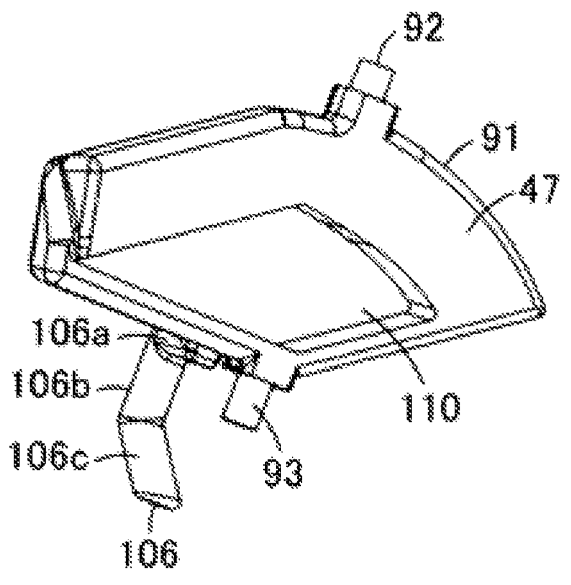
FIG. 22 is a perspective view of a part of the wind direction adjuster as viewed from the windward side.

Each ventilation opening 110 is also called a vent, for example, and provided by forming an opening penetrating through louver 47 (louver main body 91) in the thickness direction as illustrated in FIGS. 20 and 22. Ventilation opening 110 is an opening formed at a position near inner-side turning axis 93, i.e., a position near the center axis, substantially in a rhombus shape along the outline of louver 47 (louver main body 91).

Accordingly, louver assembly 16 is capable of successively switching between a normal mode that is a normal concentration mode for ventilation without changing the wind direction and a condensed mode for further concentrating the wind via ventilation openings 110, by operating louvers 47 by coupling portion 46 in conjunction with each other.

Moreover, inner-side turning axis 93 of each louver 47 is axially supported by inner-side axial support hole 84 at a more leeward position than outer-side turning axis 92. Each louver 47 is held in a state where turning axes 92 and 93 are inclined to the windward side with respect to the radial direction of louver assembly 16 (housing portion 45). For this reason, inclined portion 91*a* of louver main body 91 of each louver 47 is positioned substantially in parallel with the center axis of louver assembly 16 (housing portion 45).

Figure 21:
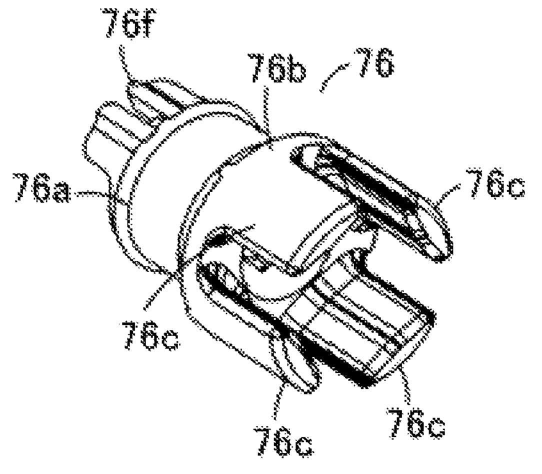
FIG. 21 is a perspective view of a louver of the wind direction adjuster.

Moreover, as illustrated in FIGS. 20 and 21, knob portion 76 includes coupling portions 76*f*, which are provided at bearing portion 76*a* in a protruding manner and configured to be inserted and coupled to operation knob 75. In addition, knob portion 76 includes projecting portions 76*c*, which are provided in a protruding manner towards the windward side from the peripheral portion of flange portion 76*b*.

Figure 16:
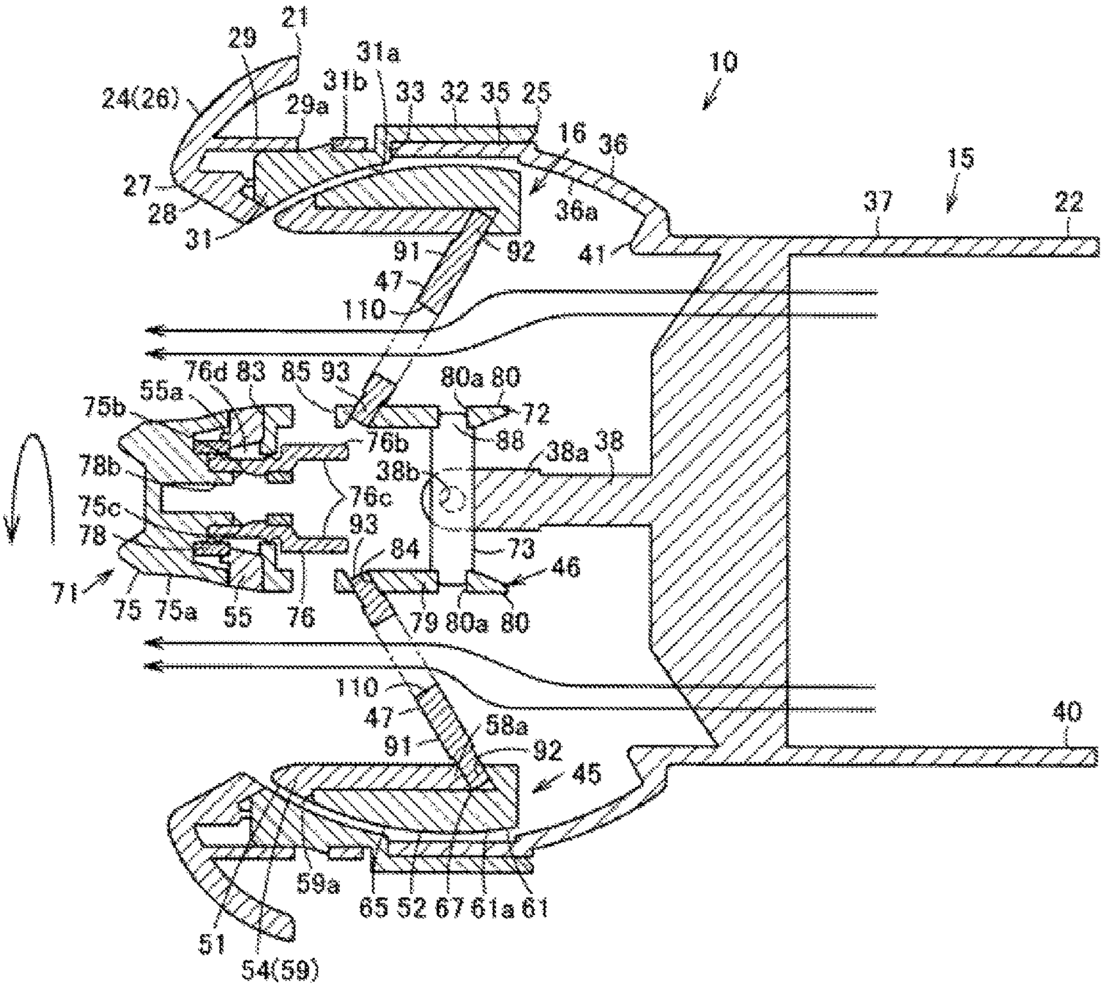
FIG. 16 is a vertical cross-sectional view of a wind direction adjuster according to a third embodiment of the present invention in a condensed mode.
Figure 17:
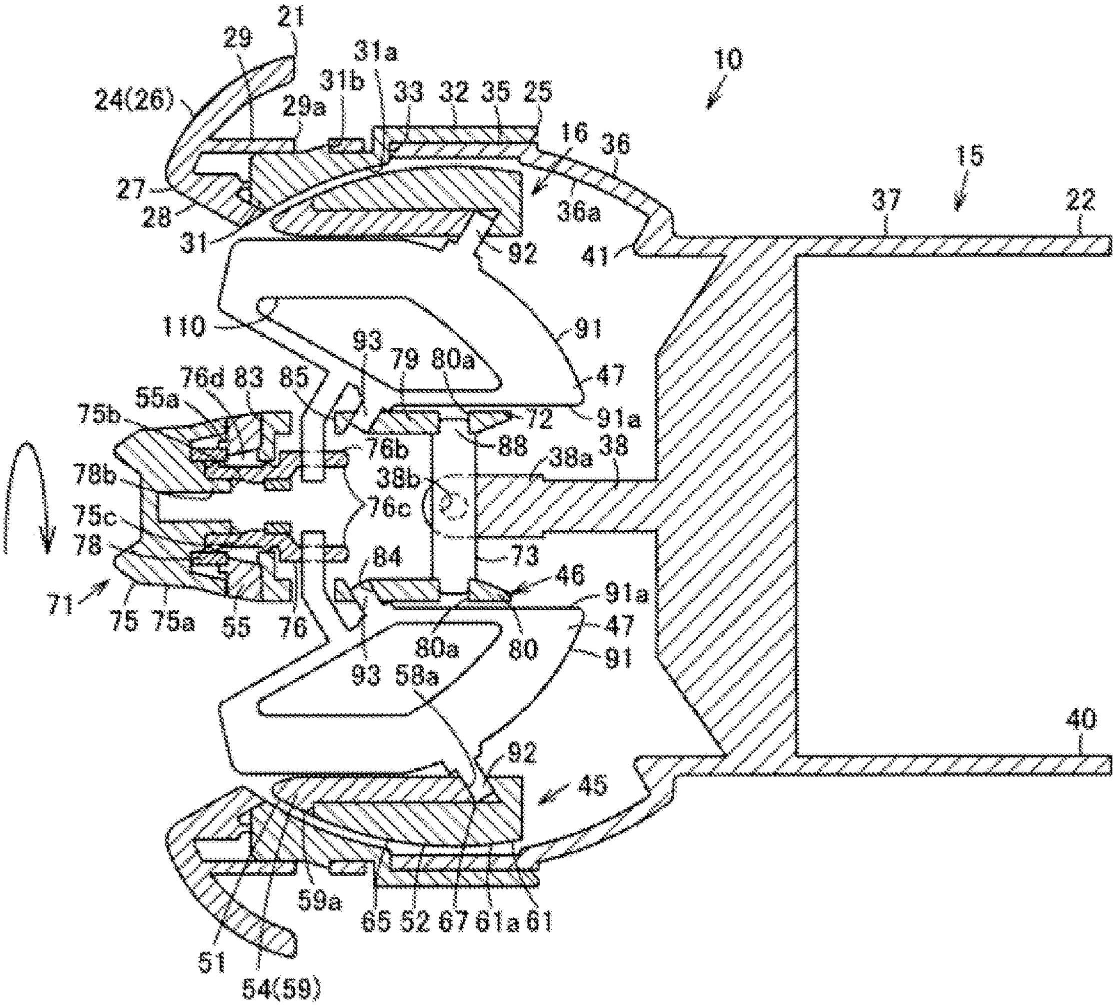
FIG. 17 is a vertical cross-sectional view of the wind direction adjuster in a normal mode.
Figure 18:
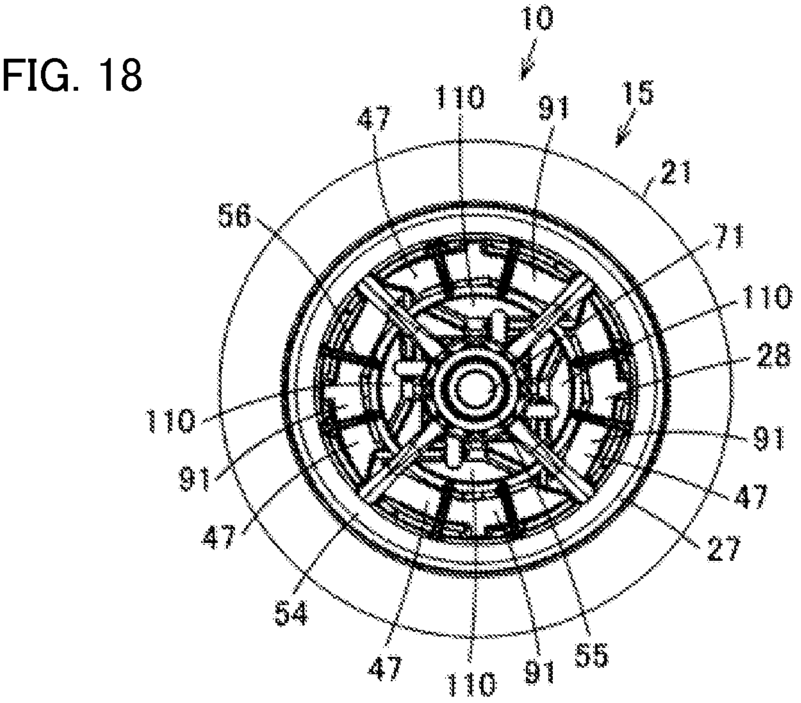
FIG. 18 is a front view of the wind direction adjuster in the condensed mode as viewed from a leeward side.
Figure 19:
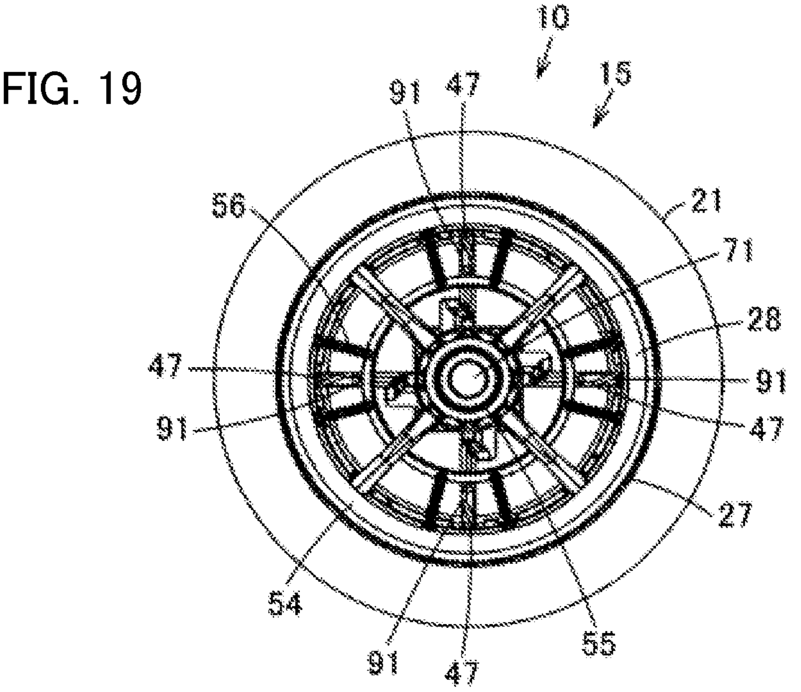
FIG. 19 is a front view of the wind direction adjuster in the normal mode as viewed from a windward side.

In wind direction adjuster 10, each louver 47 is operated by turning operation knob 75 of knob 71, which is exposed from wind outlet 27, clockwise or counter-clockwise in the circumferential direction. Thus, wind direction adjuster 10 switches between the condensed mode for concentrating the wind near the center axis as illustrated in FIGS. 16 and 18 and the normal mode for letting the wind pass through forward as illustrated in FIGS. 17 and 19. Note that, in the third embodiment, since ventilation opening 110 is formed in each louver 47, wind direction adjuster 10 does not include the blocking mode for blocking wind or the spreading mode for spreading wind.

In the condensed mode illustrated in FIGS. 16 and 18, insertion axis portions 106*c* of actuator axes 106 of louvers 47 each held between projecting portions 76*c* of knob 71 are pushed and move along operation openings 85 towards the other ends of operation openings 85. Accordingly, louver main bodies 91 (both side surfaces of louver main bodies 91) of louvers 47 turn (tilt) in the same direction substantially orthogonal to the front and rear direction that is the axis direction of housing portion 45 until actuator axes 106 and turning axes 92 and 93 are placed in the left and right positional relationship (positioned in the circumferential direction of housing portion 45). In other words, louver main bodies 91 turn until actuator axes 106 are positioned linearly along the up and down direction in the other side direction of turning axes 92 and 93 as viewed in the front and rear direction. Thus, all louvers 47 are positioned in such a way that the outer sides of all louvers 47 with respect to the axis direction of louver assembly 16 (housing portion 45) are inclined to the windward side, i.e., all louvers 47 are gradually inclined to the leeward side from the outer side to the inner side. The wind introduced into the flow passage from introduction port 40 is concentrated towards the center axis of louver assembly 16 (housing portion 45) along louver main bodies 91 and caused to pass through ventilation openings 110 and to blow straight near the center of wind outlet 27 along the axis direction of louver assembly 16

(housing portion 45). Accordingly, the wind blows forward from wind outlet 27 in a concentrated manner in wind direction adjuster 10.

During the normal mode illustrated in FIGS. 17 and 19, projecting portions 76*c* provided in a protruding manner at knob portion 76, which is coupled to operation knob 75 of knob 71 turned in one direction, turn in synchronization in the turning direction of knob 71 (operation knob 75). This turning of projecting portions 76*c* pushes and moves insertion axis portions 106*c* of actuator axes 106 of louvers 47 each held between projecting portions 76*c*, along operation openings 85 in one direction of operation openings 85. Actuator axes 106 are placed in a positional relationship to protrude in a shape similar to a right square bracket towards one side direction of louvers 47 as viewed in the front and rear direction, and entire louver main bodies 91 (both side surfaces of louver main bodies 91) of louvers 47 are arranged radially along the radial direction of housing portion 45. More specifically, the opening direction of ventilation openings 110 is a direction substantially orthogonal to the direction of the wind, thus causing no influence on the direction of the wind. Thus, louver main bodies 91 let the wind introduced into the flow passage from introduction port 40 pass through straight along the axis direction of louver assembly 16 (housing portion 45) basically without changing the direction of the wind. Accordingly, the wind blows forward from wind outlet 27 in wind direction adjuster 10.

As described above, in the third embodiment, it is made possible to move multiple louvers 47 in conjunction with each other with a simple configuration and without using a precision component such as a gear for coupling knob 71 and each louver 47 together and thus to downsize the coupling structure of knob 71, spacer 72, and louvers 47. Thus, components can be formed without much work and incorporation (assembly) of the components is easy. For this reason, it is possible to suppress manufacturing costs and to easily design wind direction adjuster 10 while reducing the ventilation resistance and improving the degree of freedom for design and layout as wind direction adjuster 10. Thus, the same operational effects as those of the first embodiment described above can be obtained.

In addition, ventilation opening 110 is formed by forming an opening that penetrates through louver main body 91 of each louver 47 in the thickness direction, and louver main body 91 turns so as to proceed louver 47, i.e., so as to turn louver 47 in a direction intersecting with the axis direction of louver assembly 16 (housing portion 45). Thus, the wind is concentrated towards the center of wind outlet 27 by ventilation openings 110, and the flow rate of wind can be increased with a simple configuration.

Moreover, forming ventilation openings 110 at positions closer to inner-side turning axes 93 of louver main bodies 91 allows the wind to be concentrated towards the center of wind outlet 27 more effectively.

In each louver 47, inner-side turning axis 93 is axially supported by inner-side axial support hole 84 at a more leeward position than outer-side turning axis 92, and turning axes 92 and 93 are inclined to the windward side with respect to the radial direction of louver assembly 16 (housing portion 45). Thus, when turning is made for each louver 47 to proceed, the wind can be concentrated towards the center axis of louver assembly 16 (housing portion 45) along louver main body 91. More specifically, it is made possible to more effectively concentrate the wind towards the center of wind outlet 27 while suppressing the ventilation resistance.

Figure 23A:
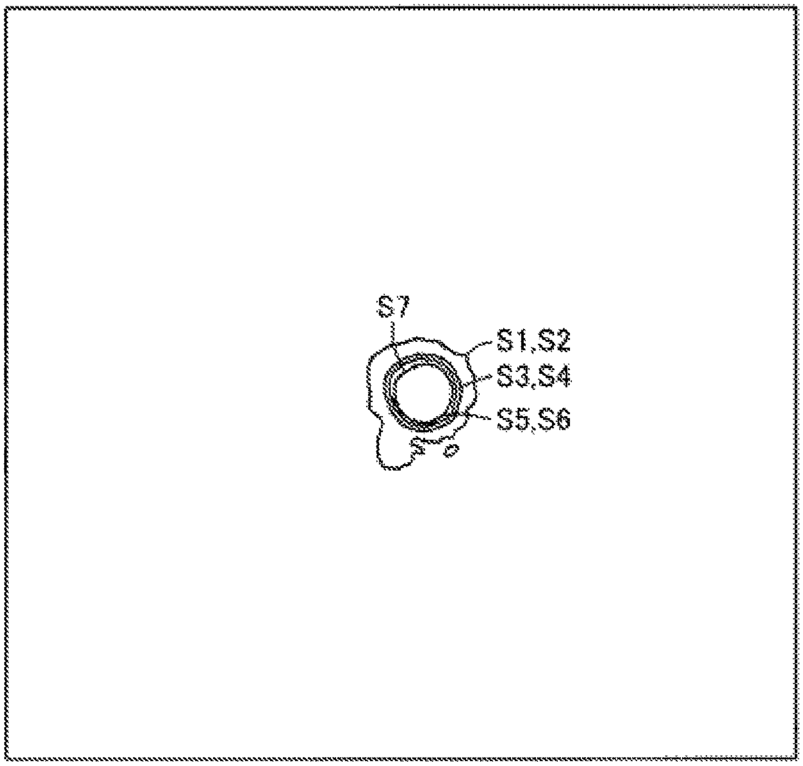
FIG. 23A is an analysis cross-sectional view of wind in the wind direction adjuster in the condensed mode.
Figure 23B:
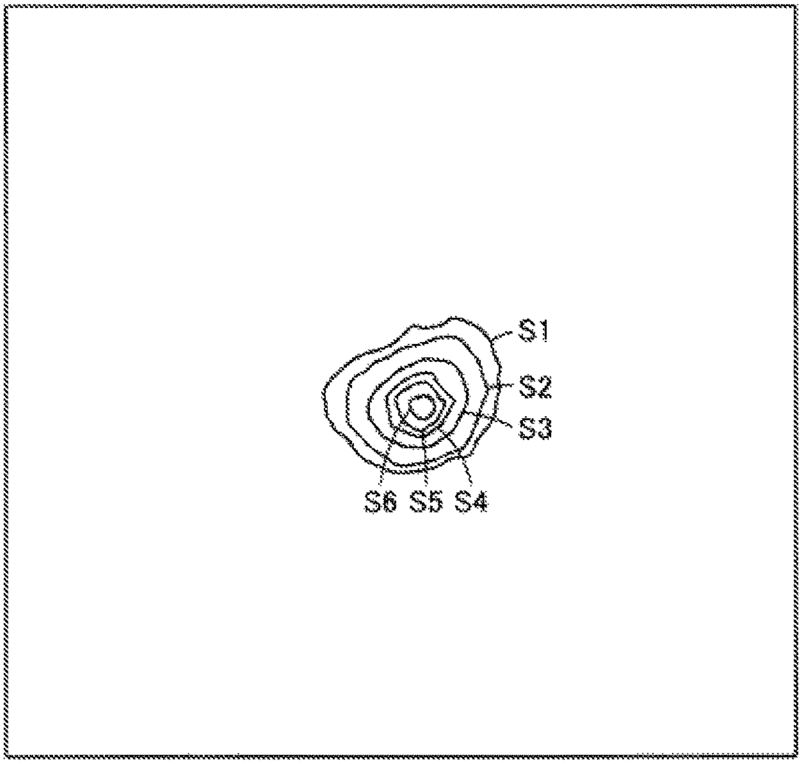
FIG. 23B is an analysis cross-sectional view of wind in the wind direction adjuster in the normal mode.

More specifically, FIGS. 23A and 23B illustrate wind speed cross sections at a front seat passenger position with respect to a predetermined input flow rate (e.g., 1.0 $m^3$/min) in a state corresponding to the condensed mode illustrated in FIGS. 16 and 18 and in a state corresponding to the normal mode indicated in FIGS. 17 and 19. FIG. 23A illustrates a constant velocity line (constant pressure line), and wind speeds (pressures) S1 to S7 are illustrated in such a manner that wind speeds S1 to S7 increase sequentially in the order named. It can be observed that the wind range is narrow and the wind speeds at the center portion are high during the condensed mode illustrated in FIG. 23A, compared with the wind range and wind speeds during the normal mode illustrated in FIG. 23B.

For example, there are demands for summer air conditioning such as exposure to cool air, and a prompt decrease in in-vehicle temperature. Although the related art attempts to meet such demands by the performance of the blower of an air conditioner, the third embodiment allows concentrated wind to be easily generated by a turning operation of knob 71 and allows the flow rate to be variable freely by individual ventilation openings 110. Accordingly, the sensible temperature can be lowered without any change in the temperature of wind from the blower of the air conditioner, and cool air exceeding the maximum value of the performance of the blower can be supplied. For this reason, the reduction range of the temperature setting for the air conditioner can be controlled, so that the power consumption can be suppressed. Accordingly, the third embodiment is effectively applicable to electric automobiles, in particular. In addition, since the flow speed is increased, cool air can be promptly supplied to the rear seat (circulation feature). As a result, a simple and low-cost independent temperature adjustment feature can be added by wind direction adjuster 10.

Note that, ventilation openings 110 according to the third embodiment described above may be applied to the first embodiment.

The wind direction adjuster according to each of the embodiments described above can be used not only as a part of an in-vehicle air conditioner, but also as a part of any air conditioner.

Moreover, the shape of outer frame portion 65 is not limited to a cylindrical shape, and may be a square or polygonal tube shape, for example.

In addition, each outer-side turning axis 92 is provided at a coaxial position with respect to inner-side turning axis 93 of louver main body 91, but a configuration without outer-side turning axis 92 may be adopted as long as inner-side turning axis 93 of louver main body 91 is axially supported for sure by inner-side axial support hole 84, which is provided in spacer 72.

INDUSTRIAL APPLICABILITY

The present invention is applicable to a wind outlet unit of an air conditioner provided to an automobile instrument panel, for example.

REFERENCE SIGNS LIST

10 Wind direction adjuster
15 Outer portion
45 Housing portion
47 Louver
55 Bearing portion
65 Outer frame portion

67 Outer-side axial support hole serving as outer-side axial support portion
71 Knob serving as operation unit
72 Spacer serving as fixing unit
73 Link unit
76*c* Projecting portion
84 Inner-side axial support hole serving as inner-side axial support portion
85 Operation opening
91 Louver main body
92 Outer-side turning axis
93 Inner-side turning axis
94, 106 Actuator axis
106*a* Protruding portion
106*b* Coupling portion
106*c* Insertion axis portion
110 Ventilation opening

The invention claimed is:

1. A wind direction adjuster comprising:

a housing portion including a cylindrical outer frame portion and a bearing portion, the outer frame portion having an inner side serving as a flow passage, the bearing portion being provided at a center axis side position of the cylindrical outer frame portion;

a fixing unit including an inner-side axial support portion and an operation opening that is formed along a circumferential direction, the fixing unit being fixed to the bearing portion;

an operation unit including a projecting portion, the operation unit being axially supported by the bearing portion turnably in the circumferential direction and being externally operable; and a louver including a louver main body, an inner-side turning axis, and an actuator axis, the inner-side turning axis being provided to the louver main body in a protruding manner at a position facing the fixing unit, the inner-side turning axis being axially supported by the inner-side axial support portion, the actuator axis being provided to the louver main body in a protruding manner at a position of the louver main body that faces an outer circumference surface of the fixing unit and that is spaced from the inner-side turning axis, the actuator axis being inserted into the operation opening, the actuator axis being movable along the operation opening when the actuator axis is pushed by the projecting portion as the projecting portion is turned in the circumferential direction by a turning of the operation unit in the circumferential direction, the louver main body being disposed along a radial direction of the housing portion, wherein:

the housing portion further includes an outer-side axial support portion provided to the cylindrical outer frame portion, and the louver further includes an outer-side turning axis provided to the louver main body in a protruding manner and configured to be axially supported by the outer-side axial support portion.

2. The wind direction adjuster according to claim 1, wherein the inner-side turning axis is provided in a protruding manner at a more leeward position than the actuator axis in the louver main body.

3. The wind direction adjuster according to claim 1, wherein the inner-side turning axis is provided in a protruding manner at a more windward position than the actuator axis in the louver main body.

4. The wind direction adjuster according to claim 3, wherein:

the actuator axis includes:

a protruding portion that protrudes from the louver main body in a thickness direction of the louver main body;

a coupling portion that is bent towards the operation unit from the protruding portion; and an insertion axis portion that is provided at a leading end portion of the coupling portion in a bent shape towards the operation unit so as to fold back in the thickness direction and that is inserted between the projecting portions of the operation unit and held by the projecting portions.

5. The wind direction adjuster according to claim 1, further comprising:

a cylindrical outer portion configured to house the housing portion; and a link unit that is axially supported turnably in a predetermined reciprocating direction with respect to the cylindrical outer portion and is configured to axially support the fixing unit turnably in another reciprocating direction intersecting with the predetermined reciprocating direction.

6. The wind direction adjuster according to claim 1, wherein the louver includes a ventilation opening made by forming an opening that penetrates through the louver main body in a thickness direction of the louver main body.

7. The wind direction adjuster according to claim 1, wherein:

the inner-side turning axis is axially supported by the inner-side axial support portion at a more leeward position than the outer-side turning axis; and the inner-side turning axis and the outer-side turning axis are inclined towards a windward side with respect to the radial direction of the housing portion.

* * * * *